United States Patent
Uemura et al.

(10) Patent No.: US 8,698,920 B2
(45) Date of Patent: Apr. 15, 2014

(54) IMAGE DISPLAY APPARATUS AND IMAGE DISPLAY METHOD

(75) Inventors: Yuiko Uemura, Hachioji (JP); Akira Tani, Sagamihara (JP); Naohisa Nakada, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 350 days.

(21) Appl. No.: 12/709,597

(22) Filed: Feb. 22, 2010

(65) Prior Publication Data

US 2010/0214442 A1 Aug. 26, 2010

(30) Foreign Application Priority Data

Feb. 24, 2009 (JP) .................. 2009-040226
Feb. 24, 2009 (JP) .................. 2009-040227

(51) Int. Cl.
H04N 5/76 (2006.01)
H04N 5/228 (2006.01)
H04N 5/222 (2006.01)
G06K 9/46 (2006.01)

(52) U.S. Cl.
USPC .............. 348/231.2; 348/231.3; 348/222.1; 348/333.01; 348/333.05; 382/190

(58) Field of Classification Search
USPC ........ 348/231.2, 231.3, 231.5, 231.6, 333.01, 348/333.02, 333.05, 222.1; 382/118, 190
See application file for complete search history.

(56) References Cited

U.S. PATENT DOCUMENTS 7,664,743 B2 * 2/2010 Okawa ..................... 707/769
2006/0251292 A1 11/2006 Gokturk et al.
2007/0003113 A1 * 1/2007 Goldberg ................. 382/118
2007/0237364 A1 10/2007 Song et al.
2009/0060294 A1 * 3/2009 Matsubara et al. ......... 382/118
2009/0196510 A1 * 8/2009 Gokturk et al. ........... 382/224

FOREIGN PATENT DOCUMENTS

| JP | 07-123307 | 5/1995 |
|---|---|---|
| JP | 2002-358522 | 12/2002 |
| JP | 2005-136841 | 5/2005 |
| JP | 2006-318352 | 11/2006 |
| JP | 2008-139941 | 6/2008 |

OTHER PUBLICATIONS

Sato, Masaaki and Yamazaki, Ryuji, "Person Search System Using Face and Clothing Features," vol. 52, No. 3 (Jun. 2006) pp. 67-71.
Office Action for Japanese Patent Application No. 2009-040227, mailed Feb. 22, 2013 (2 pgs.).

* cited by examiner

*Primary Examiner* — Twyler Haskins
*Assistant Examiner* — Peter Chon
(74) *Attorney, Agent, or Firm* — John C. Pokotylo; Straub & Pokotylo

(57) ABSTRACT

An image display apparatus according to the present invention comprises: a face detection section detecting a face image within a photographed image; a classification section classifying the photographed image by a pattern of the face image and a color or a pattern under the face image; and a display control section displaying an image of the same face with the different color or pattern according to the classification by the classification section, and displays images of the same person among the plurality of images classified by the classification section at the same time or sequentially in the display of the display control section.

20 Claims, 17 Drawing Sheets

FIG. 8A
| CLASSIFICATION RESULT | | IMAGE 1 | IMAGE 2 | IMAGE 3 | IMAGE 4 | IMAGE 5 |
|---|---|---|---|---|---|---|
| | | SNAP | SNAP | LANDSCAPE | SNAP | SNAP |
| NUMBER OF FACES | | 2 | 3 | | 1 | 2 |
| POSITION, FEATURE, AND SIZE OF FACE | A1 | | | | | |
| | A2 | | | | | |
| | A3 | | | | | |
| | A4 | P−A·D2 | P−X·D3 | | | P−B·D2 |
| | A5 | | P−B·D3 | | P−A·D1 | P−A·D2 |
| | A6 | P−X·D3 | P−X·D3 | | | |
| | A7 | | | | | |
| | A8 | | | | | |
| | A9 | | | | | |
| COLOR UNDER FACE | | BLUE | WHITE | NONE | WHITE | WHITE WHITE |
| PATTERN | | WHITE VERTICAL STRIPE | RED HORIZONTAL STRAIPE | NONE | NONE | BLACK NONE DOT |
| DATE AND TIME & LOCATION | | 9/15 | 9/15 | 9/15 | 9/15 | 9/15 |
FIG. 8B
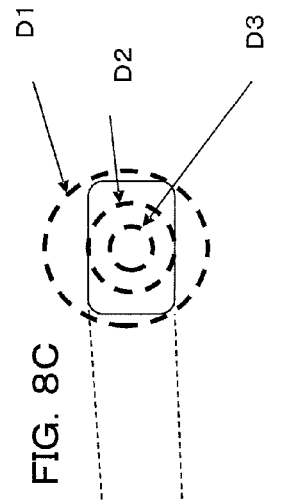
FIG. 8C
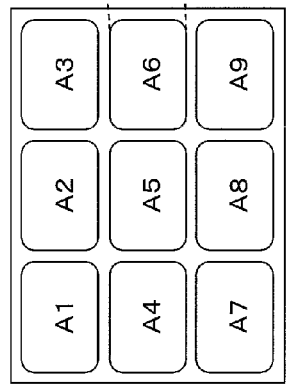

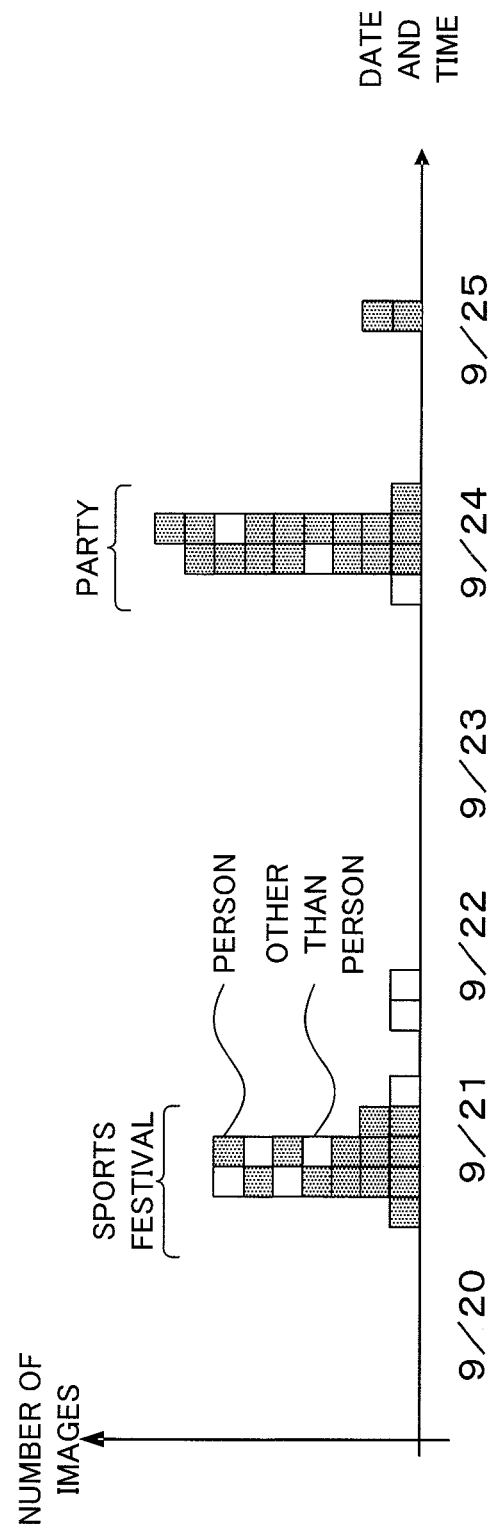

IMAGE DISPLAY APPARATUS AND IMAGE DISPLAY METHOD

Benefit is claimed, under 35 U.S.C. §119, to the filing date of prior Japanese Patent Application Nos. 2009-40226 and 2009-40227 filed on Feb. 24, 2009. These applications are expressly incorporated herein by reference. The scope of the present invention is not limited to any requirements of the specific embodiments described in the applications.

BACKGROUND OF THE INVENTION

1. Field of the Invention

The present invention relates to image display apparatuses and image display methods and specifically relates to an image display apparatus and an image display method that reproduce and display image data photographed by a photographing apparatus.

2. Description of the Related Art

Recently, a memory device has progressed in realizing a larger capacity and a lower cost, and it has become possible to store a large volume of image data by including the memory device in a photographing apparatus such as a camera. Further, a display panel provided on the rear side of a camera or the like, such as a liquid crystal panel, has progressed in realizing a large size screen, and a preserved image is displayed on the display panel and viewed for enjoyment. In addition to the photographing apparatus such as a camera, the preserved image is displayed on a personal computer or a television connected with the photographing apparatus or the like and more frequently many people enjoy watching the image together.

When an image is displayed on the display panel or the like, it is difficult to search for an object image among a large number of images. Accordingly, various image display apparatuses have been proposed for easily classifying the images. For example, Japanese Patent Laid-Open No. 7-123307 (published on May 12, 1995) discloses an image display apparatus which records attached information, such as a photographing date and time, a photographing posture, a photographing location, and a photographer, together with image data, and arranges and preserves images using this attached information to allow an object image to be viewed for enjoyment by classifying and searching the images.

SUMMARY OF THE INVENTION

The present invention aims for providing an image display apparatus and an image display method that can reproduce and display variegated images stimulating communication.

An image display apparatus according to a first invention comprises: a face detection section detecting a face image within a photographed image; a classification section classifying the photographed image by a pattern of the face image, a color under the face image, or a pattern under the face image; and a display control section displaying the plurality of photographed images according to the classification by the classification section.

An image display apparatus according to a second invention comprises: a storage section storing a photographed image; a person image extraction section extracting an image of a person from the photographed image; a clothes determination section determining a clothes part in the image of a person extracted by the person image extraction section; a search section searching for an image in which the same person extracted by the person image extraction section has been determines to wears different clothes by the clothes determination section; and a display section displaying the image searched for by the search section.

An image display method according to a third invention comprises the steps of: determining that a person has been designated in a stored photographed image; determining a clothes part in an image of the designated person; searching for an image of different clothes of the same person as the designated person; and displaying the image that has been searched for.

BRIEF DESCRIPTION OF THE DRAWINGS

FIGS. 8A to 8C are diagrams explaining related information used for image classification in a camera according to a first embodiment of the present invention.

FIG. 11 is a diagram explaining event classification in a first embodiment of the present invention.

DETAILED DESCRIPTION OF THE PREFERRED EMBODIMENTS

Figure 1:
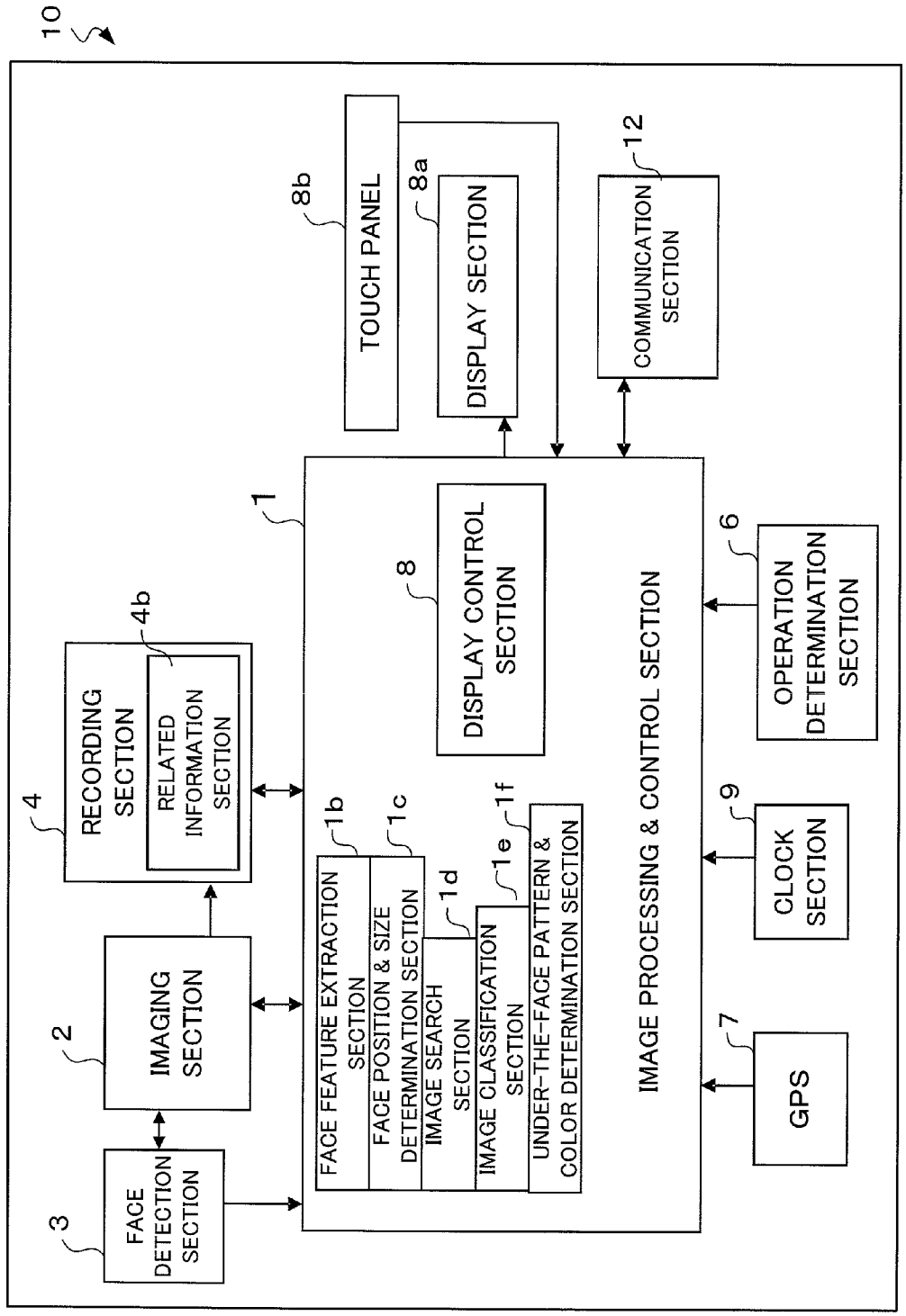
FIG. 1 is a block diagram showing an electric circuit in a camera according to a first embodiment of the present invention.
Figure 2A:
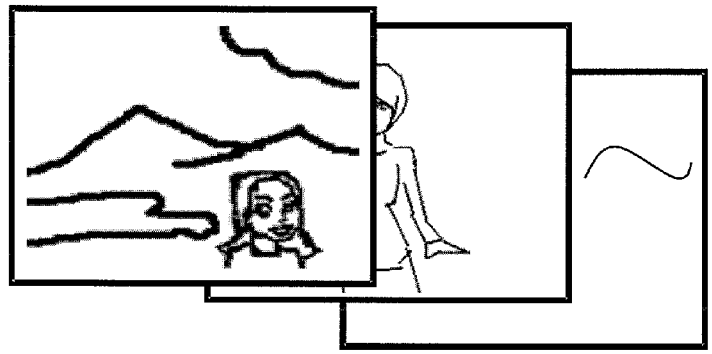
FIGS. 2A to 2D are diagrams showing states of a number of images photographed by a camera according to a first embodiment of the present invention.
Figure 2B:
Figure 2C:
Figure 2D:
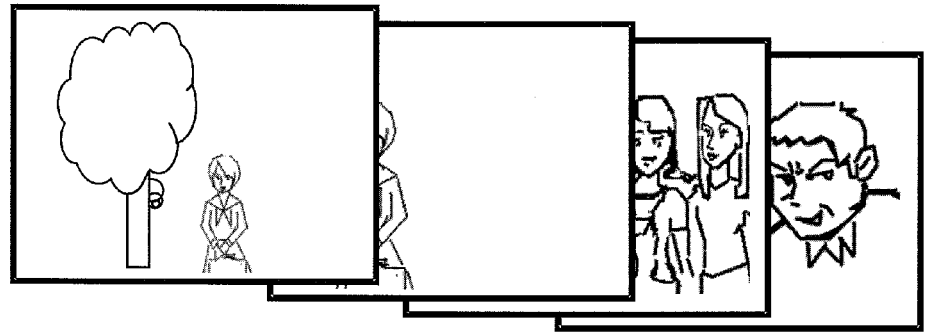
Figure 3A:
FIGS. 3A to 3D are diagrams showing states of object images extracted from images photographed by a camera according to a first embodiment of the present invention.
Figure 3B:
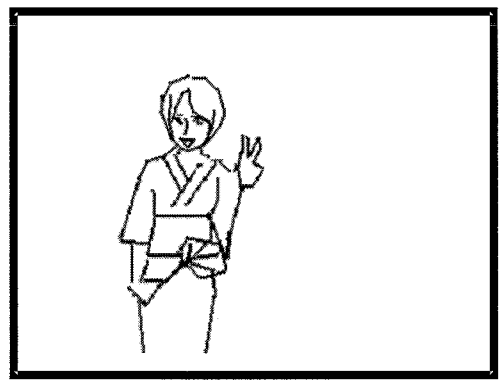
Figure 3C:
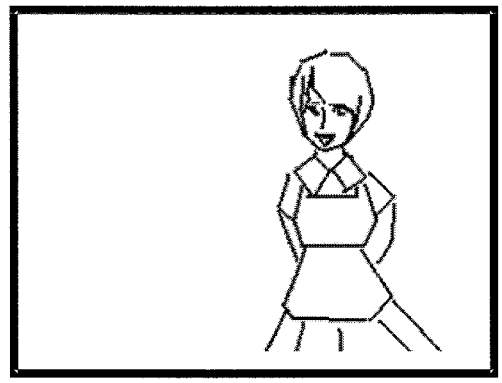
Figure 3D:

Hereinafter, preferred embodiments using a camera applying the present invention will be described with reference to the drawings. FIG. 1 is a block diagram showing an electric circuit of a camera 10 according to a first embodiment of the present invention. The camera 10 is a digital camera and configured with an image processing & control section 1, an imaging section 2, a face detection section 3, a recording section 4, an operation determination section 6, a GPS 7, a display section 8a, a touch panel 8b, clock section 9, communication section 12, etc.

The imaging section 2 includes an imaging element, a photographing lens 2, an exposure control section such as a shutter, an imaging element drive & read-out circuit, etc., and converts an object image formed by the photographing lens into image data in the imaging element. The face detection section 3 inputs the image data from the imaging section 2 and detects whether the object image includes a face image or not.

The image processing & control section 1 controls a sequence of the entire camera 10 according to a program electrically stored in a non-volatile memory which is not shown in the drawing. Further, the image processing & control section 1 obtains an image signal output from the imaging section 2 and performs various kinds of image processing such as thinning processing, edge enhancement, color correction, image compression, moving image processing, contrast adjustment, white balance, and further performs live view display, recording to the recording section 4, and image processing such as reproduction display. The image processing & control section 1 includes a face feature extraction section 1b, a face position & size determination section 1c, an image search section 1d, an image classification section 1e, under-the-face pattern & color determination section 1f, and a display control section 8.

The face position & size determination section 1c determines a position and a size of a face when the face detection section 3 has detected that the face image is included. The face feature extraction section 1b extracts a feature of a face by the positions of an eye, a nose, and a mouth, or the like. By the use of the extracted face feature, it can be determined whether the person is the same as a registered person or not. When the face position & size determination section 1c detects the face position, the under-the-face pattern & color determination section 1f determines a clothes pattern under a face such as a vertical stripe pattern and a black dot pattern, and a clothes color under the face such as red, blue, and yellow.

The image classification section 1e classifies an image into a snap photograph, a portrait photograph, a landscape photograph, or the like. The image search section 1d carries out image search using related information recorded in a related information section 4b to be described below. The related information includes image classification, a photographing date and time, under-the-face pattern & color information and the like. The display control section 8 performs live view display control according to the image signal from the imaging section 2 in photographing, and performs reproduction control of an image recorded in the recording section 4 in a reproduction mode. Further, the display control section 8 switches display in response to a touch operation on the touch panel 8b.

The recording section 4 records the image data which has been obtained by the imaging section 2 when photographing instruction was instructed by a release button, and which has been provided with the image processing by the image processing & control section 1. Further, in recording the image data, the recording section 4 relates the image data to information such as a photographing date and time and stores this related information. Further, a related information section 4b is included in the recording section 4, and stores the information such as a photographing date and time, image classification, the number of faces, a face position, an under-the-face clothes color, a clothes pattern in association with the image data to be recorded in the recording section 4. This related information will be described below by the use of FIG. 8.

The operation determination section 6 includes various operation members such as a release button, a power switch, a reproduction mode button, a thumbnail button, a forward button, a backward button, an album button, and determines the operation states of these operation members to send the results to the image processing & control section 1. The image processing & control section 1 controls photographing or reproduction in a predetermined sequence according to the operation states of the operation members. The GPS 7 is the Global Positioning System and measures a photographing position and stores this measurement result into the related information section 4b as the related information.

The display section 8a includes a liquid crystal panel or the like, and performs live view display before photographing and performs reproduction display of a recorded photographed image. Further, a touch panel 8b is provided on the front plane of the display section 8a, and information such as a touch position by a photographer or the like is sent to the image processing & control section 1. The touch position on the touch panel 8b is determined by the image processing & control section 1. As will be described below, when a clothes change mode is touched in the reproduction display, images of the same person wearing different clothes are sequentially displayed.

The clock section 9 has a calendar function and a clock function, and outputs a photographing date and time in photographing as described above. The photographing date and time can be utilized in the image arrangement and the image search. The communication section 12 transmits the image data converted into a digital signal to an external device such as a television and a personal computer. Transmission means includes a wire communication and also a wireless communication using infrared light or a radio wave.

Next, an electronic album function of the camera according to a first embodiment of the present invention will be described by the use of FIG. 2A to FIG. 5C. The recording section 4 records a number of image data sets and records image classification information for each of various events as the related information together with this image data. Details of this image classification will be described below by the use of FIG. 7 and FIG. 8 and details of the event will be described below by the use of FIG. 10 and FIG. 11. FIGS. 2A to 2D show image groups image-classified for each event. While the images grouped by the image classification in this manner can be viewed in a sense as if an old album were viewed, the present embodiment enables the viewing of the images to far exceed the simple viewing of the image group utilizing the feature of the digital image.

In the present embodiment, when a number of uninterested photographs exist in each event group, the photographs can be viewed in a digest version. For example, when a user sometimes wants to see a photograph of himself or herself or wants to show the photograph to the others, the user can extract the photograph of himself or herself and reproduce and display the photograph. A female user especially is interested in clothes she wears and sometimes wants to see a photograph of different clothes or wants to show the photograph to the others.

Accordingly, the present embodiment can generates the likes of an album which include photographs of the same person (including user himself or herself) wearing different clothes in a sense of changing clothes when the person is designated, and increases the enjoyment of taking a photograph. Further, while watching this album, a user sometimes wants to view a photograph of an event at the time of the photographing, and, for such a case, the user can also view the photograph of the event. It is also possible to perform searching casually with little awareness. That is, it is possible to utilize the present embodiment also for searching for an event the user has joined. Further, since a person of interest is changing clothes, the images in the album are variegated and various scenes can be enjoyed according to the difference of the clothes.

Figure 4A:
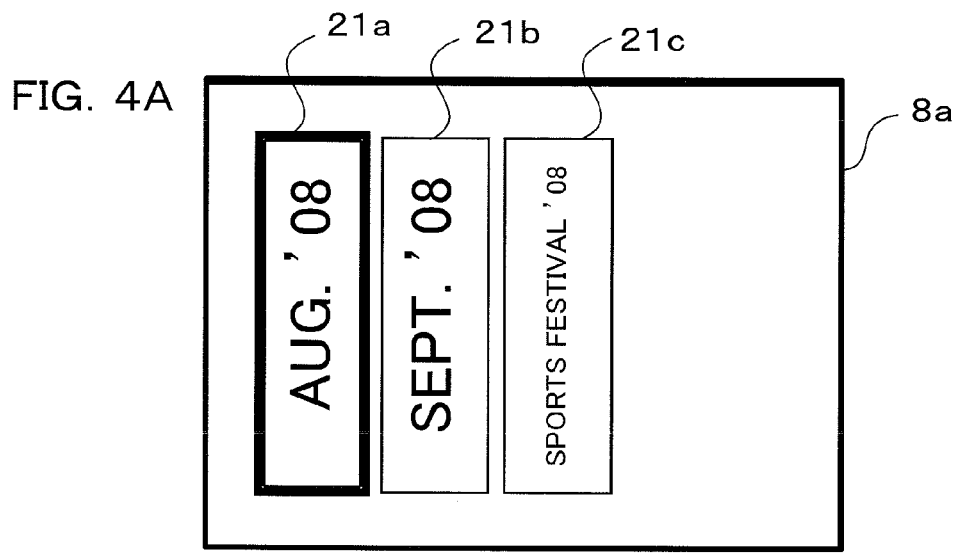
FIGS. 4A to 4C are diagrams showing states of searching for and displaying an image among images preserved in a camera according to a first embodiment of the present invention.
Figure 4B:
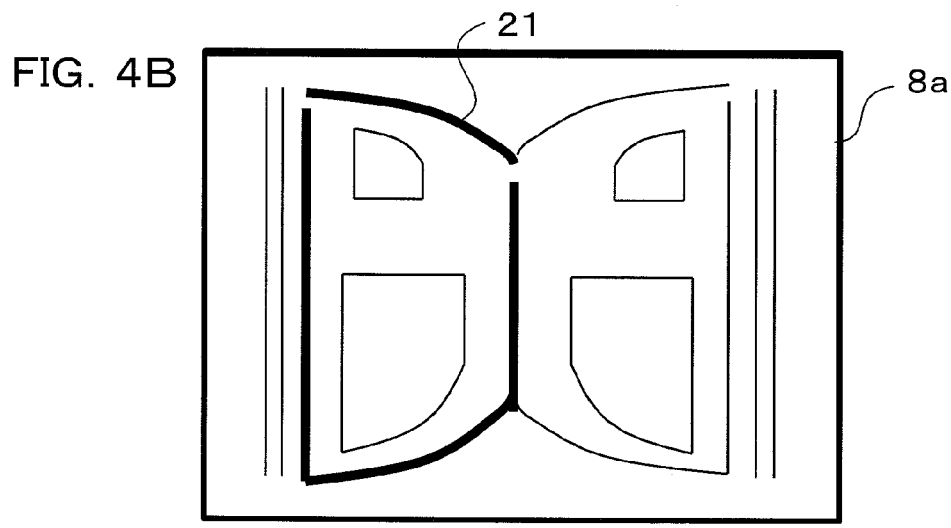
Figure 4C:
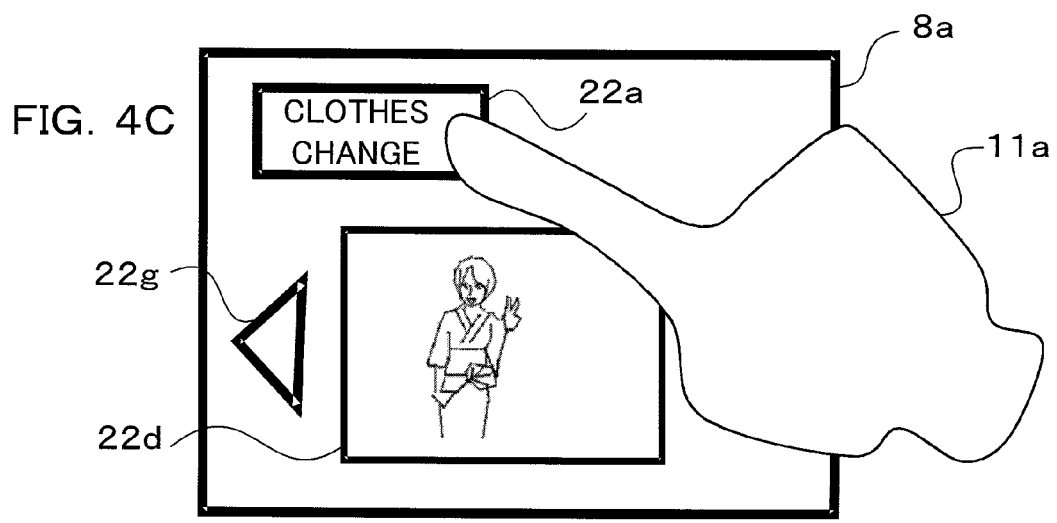

FIGS. 4A to 4C and FIGS. 5A to 5C show display states of an electronic album in the above described case of enjoying a photograph in a sense of changing clothes. FIG. 4A shows a state of arranging the electronic album of each event on the display section 8a when an album reproduction mode is set in the reproduction. An example shown in FIG. 4A arranges an album 21a in August 2008, an album 21b in September 2008, and an album 21c of a sports festival in 2008. In this state, when a user touches the album the user wants to view, the touch panel 8b can detect the touch position. The display section 8a displays an image of a transition effect as if the album 21 selected in this manner were actually opened as shown in FIG. 4B, and then displays a photographed image 22d as shown in FIG. 4C.

Figure 5A:
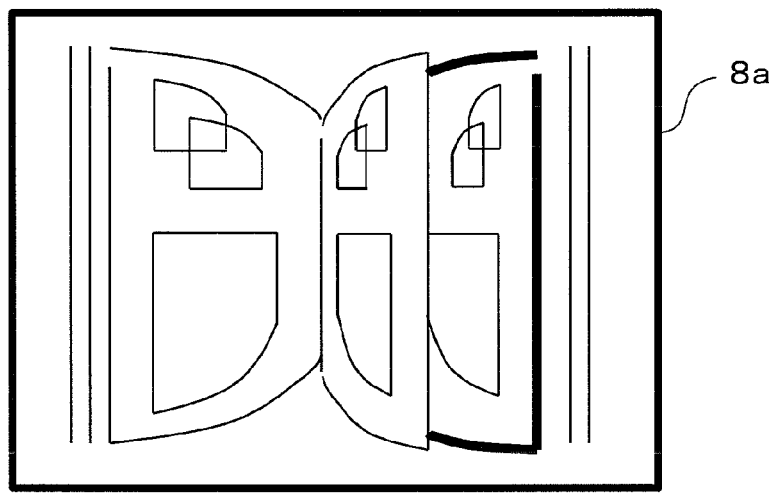
FIGS. 5A to 5C are diagrams showing states of searching for and displaying an image among images preserved in a camera according to a first embodiment of the present invention.
Figure 5B:
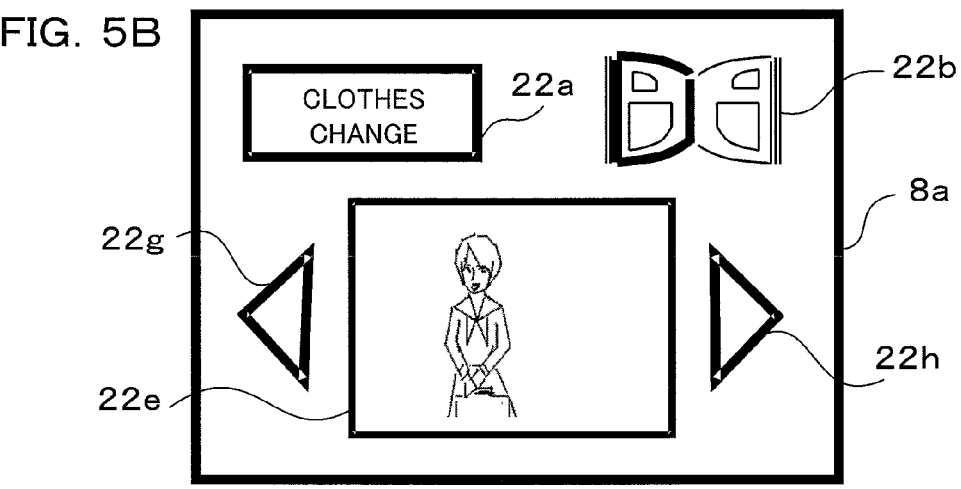

In this state, when the user wants to carry out clothes change display which searches for and displays a photograph of different clothes among photographs of the same person as one in the photographed image 22d, the user may touch a clothes change mark 22a by a finger 11a. By the touching, an image of a transition effect is shown as if the album 21 were actually opened or as if the album 21 were selected again as shown in FIG. 5A, and then a photographed image 22e of the same person wearing different clothes is searched for and displayed as shown in FIG. 5B. The photographed images 22d and 22e show the same person wearing different clothes, and provide an effect as if the clothes had been changed. In this state, when the user touches the clothes change mark 22a, a photographed image of the same person wearing different clothes is displayed for every touch as shown in FIGS. 3A to 3D.

Figure 5C:
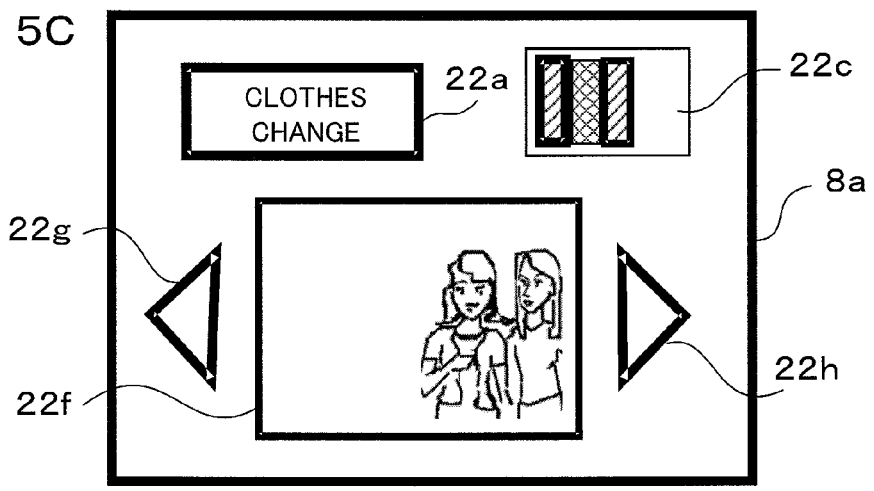
Figure 6:
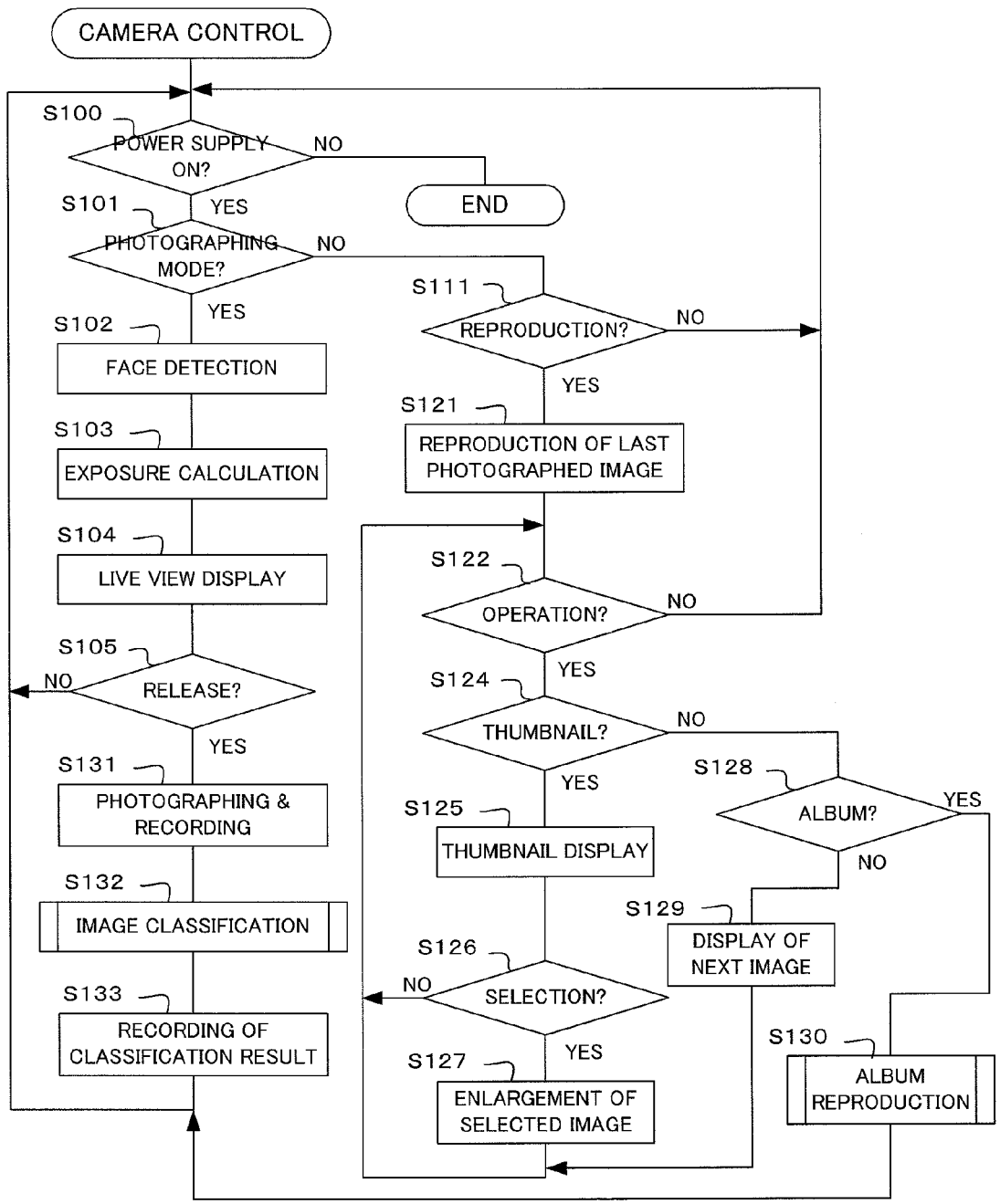
FIG. 6 is a flowchart showing a camera control operation in a camera according to a first embodiment of the present invention.

When the user wants to return to a screen for entering the clothes change display shown in FIG. 4C during the clothes change display, the user may touch a backward mark 22b displayed at the upper right of the display section 8a. Further, in the state of FIG. 5B, when the user wants to view another photographed image in the same event, the user may touch a forward button mark 22h displayed on the display section 8a or touch a backward button mark 22g, and then a photographed image 22f is displayed in response to the touch as shown in FIG. 5C. By the touch on the forward button mark 22h or the backward button mark 22g, the clothes change mode is switched to the usual album mode, and thereby an effect as a desired album has been found out is obtained with little awareness. When the clothes change mode is terminated and switched to the usual album mode by the touch on the forward button mark 22h or the backward button mark 22g, an album mark 22c is displayed.

As described above, in the present embodiment, by the operation of the clothes change mark 22a in the usual electronic album mode, the clothes change mode is switched on to search for and display a photograph of different clothes of the same person as one in a photographed image which has been displayed so far, and it is possible to enjoy variegated images in spite of the image of the same person. Further, by the operation of the forward button mark 22h or the backward button mark 22g during the clothes change mode, the display is changed to the usual electronic album mode and it is possible to view another photographed image in this event. Thereby, it is also possible to enjoy unexpectedly viewing the image again.

Next, the operation of the camera 10 providing the above enjoyable electronic album will be described by the use of FIG. 6 to FIG. 11. When entering a camera control flow shown in FIG. 6, the camera 10 determines whether a power supply is ON or not (S100). In this step, the operation determination section 6 determines whether a power switch of the operation member in the camera 10 is ON or not, and if the power switch is OFF, the camera control flow is terminated. Note that, even after the camera control flow has been terminated, the state of the power switch continues to be detected, and when the power switch is ON, the operation starts from Step S100.

If the power supply is ON in the determination result in Step S100, the camera 10 subsequently determines whether a mode is a photographing mode or not (S101). If the mode is photographing mode in this determination result, the camera 10 subsequently carries out face detection (S102). Here, the face detection section 3 determines whether a face is included or not in image data sent from the photographing section 2. Subsequently, the camera 10 carries out exposure calculation (S103). Here, the camera 10 carries out calculation of a shutter speed, an aperture value, and the like providing an appropriate exposure using the image data obtained by the photographing section 2, for the face part detected in Step S102. Further, the camera 10 also carries out focus adjustment so as to obtain a focus on the face part according to a contrast signal of the image data.

After the exposure calculation, the camera 10 carries out live view display (S104). Here, the display section 8 displays the live view of an object image in approximately 30 frames per second. A user can determines a composition and a shutter chance and carry out release operation according to the live view display.

After the live view display, the camera 10 subsequently determines whether to carry out the release operation or not (S105). Here, the operation determination section 6 determines whether the release button has been operated or not. If the release button has not been operated in this determination, the process returns to Step 100. On the other hand, if the release button has been operated in the determination result in Step S105, the camera 10 subsequently carries out photographing & recording (S131). In this photographing & recording, the image processing & control section 1 provides image processing to the image data obtained by the photographing section 2 and the recording section 4 records this image data provided with the image processing.

After the photographing & recording, the camera 10 subsequently carries out image classification (S132). Here, the camera 10 classifies the photographed image by a photograph subject such as snap, portrait, and landscape, and further detects the number of faces, a face position, a face size, a face feature, etc in the photographed image. When having detected a face, the camera 10 carries out the image classification so as to obtain various kinds of information such as the under-the-face color and pattern. A subroutine of this image classification will be described below by the use of FIG. 7.

After the image classification, the camera 10 records the result of this classification (S133). While the camera 10 records the image data in Step S131, in Step S133, the camera 10 records the classification result in association with the recorded image data into the related information section 4b in a list format as shown in FIG. 8A to be described. Further, in this step, the camera 10 also records related information such as photographing position information detected by the GPS 7 in addition to the above information. After the recording of the classification, the process returns to Step S100.

If the mode is not the photographing mode in the determination result in Step S101, the camera 10 determines whether the mode is a reproduction mode or not (S111). If the mode is not the reproduction mode in this determination result, the process returns to Step S100. On the other hand, if the mode is the reproduction mode, the camera 10 reproduces the last photographed image (S121). Here, the display section 8a displays the image which has been photographed the most lately.

After the reproduction display of the last photographed image, the camera 10 subsequently determines whether a user's operation is carried out or not (S122). Here, the operation determination section 6 determines whether the forward button or the backward button operation has been carried out or not for the reproduced and displayed image, or whether the thumbnail button for thumbnail display has been operated or not. If these operations have not been carried out in this determination result, the process returns to Step S100. On the other hand, if either one of the operations has been carried out, the camera 10 determines whether the operation is the thumbnail operation or not (S124).

If the thumbnail button has been operated in the determination result in Step S124, the camera 10 carries out the thumbnail display (S125). The thumbnail display is a view format displaying a plurality of photographed images recorded in the recording section 4 at the same time on the display section 8a. After the thumbnail display, the camera 10 determines whether or not an image has been selected in the thumbnail display (S126). Since the user selects an image to be enlarged for viewing by touching the image on the touch panel 8b in the thumbnail display, this step determines whether the selection has been carried out or not according to a touch state of the touch panel 8b.

If an image has not been selected in the determination result in Step S126, the process returns to Step S122. On the other hand, if an image has been selected in the determination result, the camera 10 enlarges and displays the selected image on the display section 8a (S127). After the enlarged display of the selected image, the process returns to Step S122.

If the thumbnail button has not been operated in the determination result in Step S124, the camera 10 determines whether the mode is an album mode or not (S128). In this step, the operation determination section 6 determines whether the user has operated the album button or not. If the mode is not the album mode in this determination result, the camera 10 reads out the next image from the recording section 4 in response to the image forward button or backward button operation and displays the image on the display section 8a (S129). After the next image display, the process returns to Step S122.

If the mode is the album mode in the determination result in Step S128, the camera 10 carries out album reproduction (S130). Here, the camera 10 carries out reproduction display in the album mode described by the use of FIGS. 4A to 4C and FIGS. 5A to 5C. A subroutine of the album reproduction will be described below by the use of FIG. 9. After the album reproduction, the process returns to Step S100.

Next, the subroutine of the image classification in Step 132 will be described by the use of FIG. 7 and FIGS. 8A to 8C. In the present embodiment, when carrying out the album display in Step S130, the camera 10 searches for a photograph of the same person wearing different clothes among snap photographs and portrait photographs. For making this search easy, the image classification section 1e carries out the image classification for the photographed image. The image classification relates image data and other information mainly obtained at the photographing to each image in a list format as shown in FIG. 8A, and records the result into the related information section 4b. By recording the related information together with the image data at photographing, it is possible to carry out the search quickly in the reproduction. Obviously, the related information may be recorded at the reproduction.

Figure 7:
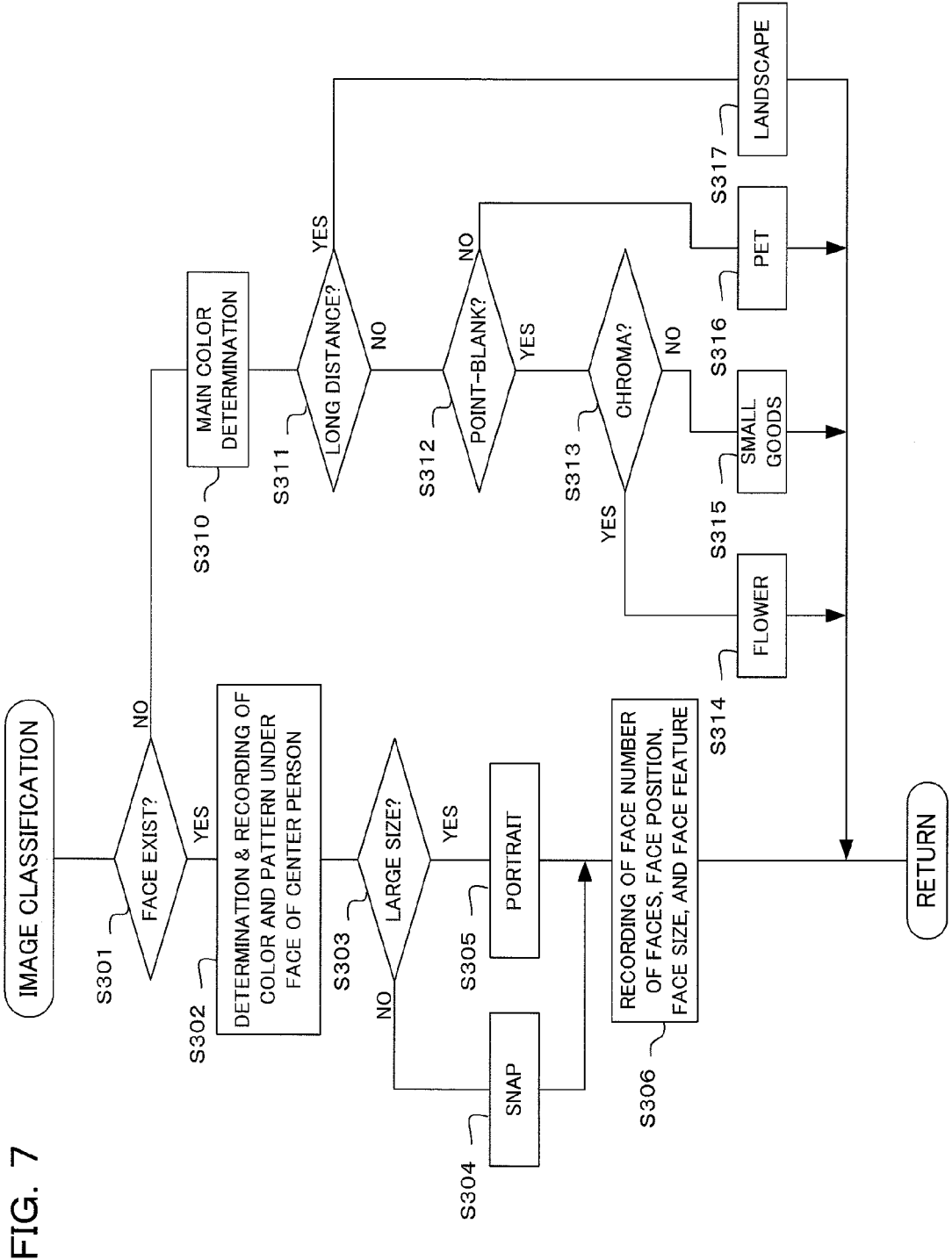
FIG. 7 is a flowchart showing an image classification operation in a camera according to a first embodiment of the present invention.

The image classification subroutine shown in FIG. 7 classifies the photographed image into a snap photograph including a whole image of a person and a large area of a background or a portrait photograph centering a facial expression, by information such as whether a face part is included in the image, a face size and the number of the faces, and a feature of the face, according to the face detection result of the face detection section 3. Further, the image classification subroutine determines color information or chroma information using the image data from the photographing section 2 and also determines the image to be a flower photograph, a photograph of small goods, a pet photograph, a landscape photograph, or the like by utilizing a focusing signal or the like.

When entering the image classification subroutine shown in FIG. 7, the camera 10 first determines whether an image includes a face or not (S301). This determination is carried out by the face detection section 3. If a face exists in this determination result, the camera 10 subsequently determines a color and a pattern of a part under the face of a center person and records the result (S302). The color of the part under the face is determined for detecting a color of clothes and this information is recorded in the related information section 4b together with a clothes pattern which has been also detected in this step.

Next, the camera 10 determines whether the size of a face is large or not (S303). If the face size is larger than a predetermined size in this determination result, the camera 10 determines that the image is a portrait photograph (S305), and, on the other hand, if the face size is smaller than the predetermined size, the camera 10 determines that the image is a snap photograph (S304). Accordingly, the determination value in Step S303 is to be a value capable of classifying the image.

After the classification in Steps S304 and S305, the camera 10 subsequently detects and determines the number of faces and the position, size, and feature of the face (S306). Here, the number of faces and the position and size of the face are detected by a determination result by the face position & size determination section 1c. Further, the feature of the face is extracted by the face feature extraction section 1b. The camera 10 preliminarily registers a face feature of a person having a possibility of being photographed such as a family member and a friend, as P-A or P-B, for example, in the face feature extraction section 1b, and determines whether the face feature meets this registered face feature or not. The detected results are recorded in the related information section 4b.

If a face does not exist in the determination result in Step S301, the camera 10 subsequently carries out main color determination (S310). Here, a main color of a screen is determined at the center or the like of a screen. The camera 10 subsequently determines whether the image is a long distance image or not (S311). This determination is carried out according to a focus position in the focusing carried out in the photographing section 2. If the image is a long distance image in this determination result, the camera 10 determines that the image is a landscape photograph (S317).

If the image is not a long distance image in the determination result in Step S311, the camera 10 subsequently determines whether the image is photographed on a point-blank side or not (S312). This determination is carried out by determining whether or not the image is photographed in a macro-range on the near distance side, also according to the focus position in the focusing carried out in the photographing section 2. If the image has not been photographed in the point-blank side range in this determination result, the camera 10 determines that the image is a pet photograph (S316). While this case possibly includes various photographs which are not taken at a long distance or at a point-blank distance, the photographs are classified here into the pet photograph. For searching for a photograph of a pet, it is possible to quickly find the photograph by searching in this classification.

If the image is a point-blank side image in the determination result in Step S312, the camera 10 subsequently determines whether chroma is high or not (S313). Here, the camera determines the chroma of the image data, and, if the chroma is higher than a predetermined value, the camera 10 determines that the image is a flower photograph, (S314). If the chroma is lower than the predetermined value, the camera 10 determines that the image is a photograph of small goods (S315). This is because a flower generally has a higher chroma than small goods.

FIG. 8A shows an example of information classified in the image classification flow and recorded in the related information section 4b. Further, FIG. 8B shows an example of image dividing, that is, an image is divided into nine regions A1 to A9 in the present embodiment. In addition, the face size is divided into three levels D1 to D3 in each of the regions A1 to A9. In the drawing, Image 1 is a snap photograph having two faces and includes a registered person P-A having a face size of D2 in the region A4 and an unknown person P-X having a face size of D3 in the region A6. Further, the color under the face is blue, the pattern of clothes is a white vertical stripe pattern, and the photographing date and time is September 15. While Image 1 includes two persons, the color and pattern under the face are detected for a person having a larger face (here, P-A).

For each of Image 2 to Image 5, information related to the image is recorded as shown in FIG. 8A. Image 2 includes three persons and all the faces have the same size of D3. In this case, the color and pattern of the center person are detected and recorded. Further, Image 5 includes two persons and both faces have the same size of D2. In this case, a priority cannot be assigned and both of the colors and patterns under the respective faces are recorded. In the example of Image 5, one person wares white clothes with black dots under the face and the other one wears white clothes without a pattern under the face. Note that the persons P-A, P-b, P-X, and the like are determined by the face feature extraction section 1b. Here, P-A and P-B are preliminarily registered persons such as a family member and a friend, and P-X is assigned to a person who is not registered.

By such image classification, it is possible to carry out image search quickly and efficiently. For example, when searching for a face image, it is possible to eliminate the image classified in Steps S314 to S317 from a search target and thereby to search for the target quickly and efficiently. Further, since a person is recorded to be classified into P-A, P-B, and the like by the face featured extraction section 1b and further a color or a pattern of a part under a face, that is, a part of clothes is recorded for each image, it is possible to search for an image of the same person with different clothes quickly and efficiently.

Figure 9:
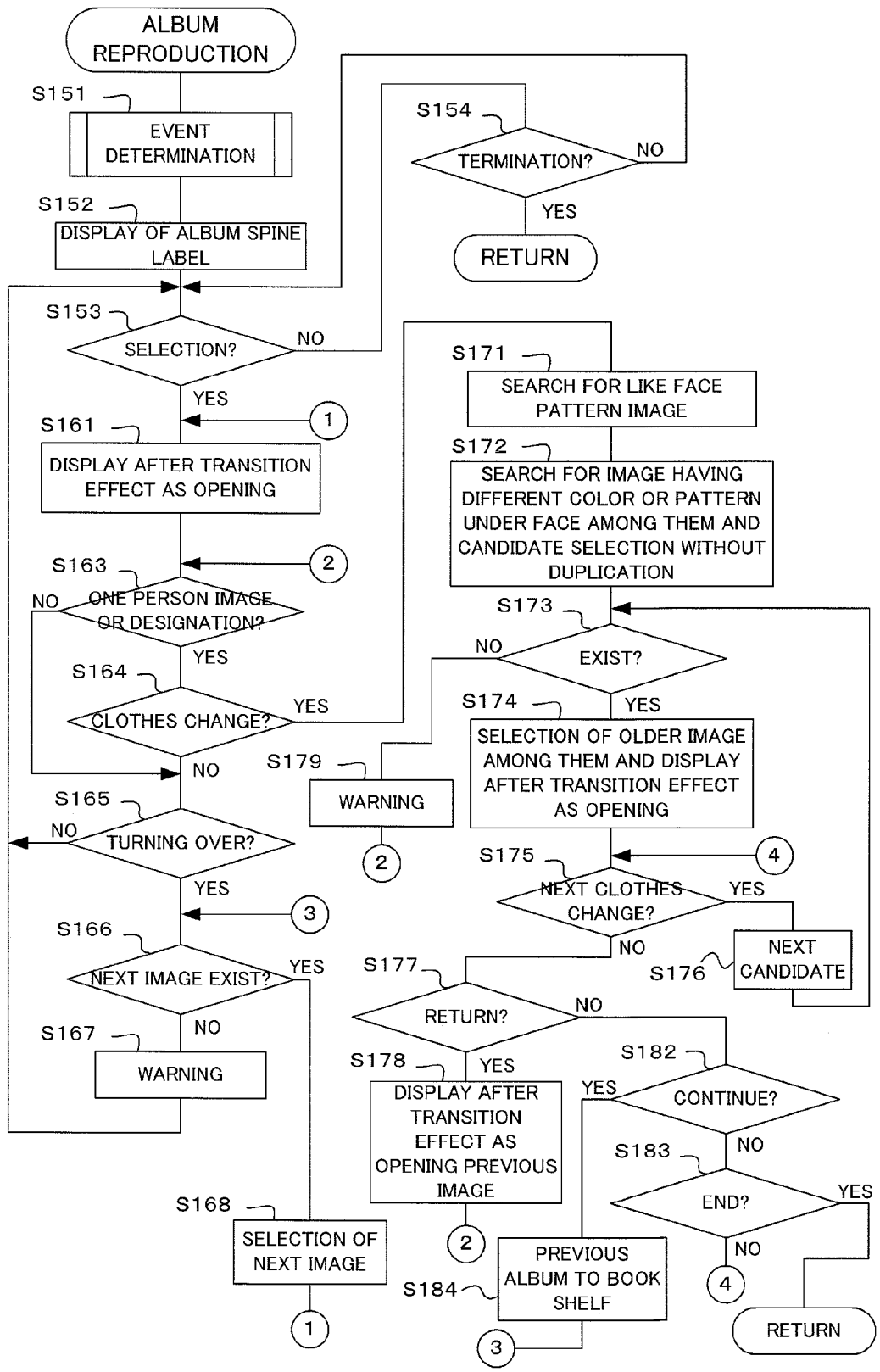
FIG. 9 is a flowchart showing an album reproduction operation in a camera according to a first embodiment of the present invention.

Next, the album reproduction subroutine in Step 130 will be described by the use of FIG. 9. When entering into the album reproduction subroutine, the camera 10 first carries out event determination (S151). In the event determination, the camera 10 groups images photographed during a predetermined period for handling the images as an album, utilizing the photographing date and time information obtained by the clock section 9. A subroutine of this event determination will be described below by the use of FIG. 10.

After the event determination, the camera 10 subsequently displays the spine label of the album (S152). Here, as shown in FIG. 4A, the display section 8a displays a pseudo book shelf and displays a state of albums 21a to 21c arranged there. After the display of the album spine label, the camera 10 subsequently determines which album has been selected among the albums 21a to 21c (S153). Here, the camera 10 determines which album has been touched by the user among the albums 21a to 21c.

If any of the album 21a to album 21c has not been selected in the determination result in Step S153, the camera 10 determines whether to terminate the album mode or not (S154). Here, the camera 10 determines whether or not the album button has been operated again. If the album button has not been operated in this determination, the process returns to Step S153, and, on the other hand, if the album button has been operated, the camera 10 terminates the album reproduction flow and returns to the original flow.

If any of the album 21a to 21c has been selected in the determination result in Step S153, the camera 10, after displaying an image of a transition effect as opening the album, displays a photographed image of the selected album (S161). Here, the camera 10 displays album opening operation as shown in FIG. 4B and then displays a photographed image 22d as shown in FIG. 4C. Subsequently, the camera 10 determines whether one person image or not or whether one person has been designated or not (S163). Here, the camera 10 determines whether or not one person exists in the photographed image 22d or whether or not one person has been touched by the user's finger 11a among persons in the photographed image 22d. The determination whether or not one person exists in the photographed image is performed by determining the number of faces in the image classification shown in FIG. 8A.

If one person exists in the photographed image or one person has been touched for designation in the determination result in Step S163, the camera 10 determines whether the clothes change mode has been set or not (S164). Here, the camera determines whether the user's finger 11a has touched the clothes change mark 22a or not, as described in FIG. 4C. If the clothes change mode has not been set in this determination result, or if the touch for designation has not been carried out even in the case of the one person image in the determination result in Step S163, the camera 10 subsequently determines whether to turn over a page or not (S165). Here, the camera 10 determines whether either the forward button mark 22h or the backward button mark 22g has been touched or not.

If the page turning over has not been set in the determination result in Step S165, the process returns to Step S153. On the other hand, if the page turning over has been set in the determination result, the camera 10 determines whether the next image exists or not in the album selected in Step S153 (S166). Here, it is determined whether an image exists or not corresponding to the forward button mark 22h or the backward button mark 22g. If the next image does not exist in this determination result, the camera 10 displays a warning image (S167) and returns to Step S153. On the other hand, if the next image exists, the camera 10 displays the next image (S168) and returns to Step S161.

If the clothes change mode has been set in the determination result in Step S164, the camera carries out like face pattern image search (S171). Here, the camera 10 searches for a like face pattern image of a person who is likely the same person as one in the one person image or one designated by the touch in the determination in Step S163. The image is searched for not only in the album which includes the selected image but also in all the images. Obviously, the number of albums may be limited preliminarily. While this search is carried out by the use of P-A, P-B . . . of FIG. 8A, not limited to this method, the search may be carried out by pattern recognition directly using a face image in the photographed image.

After the like face pattern image search, the camera 10 subsequently searches for an image having a different color or pattern under a face among the found like face images and selects candidates without duplication (S172). Here, the camera 10 searches for an image having a different color or pattern under a face among images of persons who are likely the same person, for searching for a photographed image of different clothes. For the search, the camera 10 uses the related information regarding the color and pattern under a face shown in FIG. 8A. In the searches in Steps S171 and S172, a high priority is preferably provided to an image of one person, and a lower priority is provided to an image, even a one person image, in which the person image is so small to be identified or too much closed up for clothes identification, and a higher priority is provided to an image having a predetermined size such as a snap photograph. Here, the camera 10 selects not only one candidate image but also a plurality of candidates across a number of albums.

Next, the camera 10 determines whether the candidate image has been found in Step S172 (S173). If the candidate image has not been found in this determination result, the camera 10 displays a warning image (S179) and returns to Step S163. This is because the camera 10 cannot display the image of the same person with different clothes in this case.

If the candidate image has been found in the determination result in Step S173, the camera subsequently selects an older one among the images and displays the image as shown in FIG. 5B, after having displayed an image of a transition effect as opening the album as shown in FIG. 5A. Note that, while the image is displayed here from an older image, the image may be displayed adversely from a newer image.

Next, the camera 10 determines whether to carry out the next clothes change or not (S175). Here, the camera 10 determines whether the clothes change mark 22a has been touched again. If the next clothes change is to be carried out in this determination, the camera 10 selects a next older image among the candidate images selected in the Step S172. When having selected the next candidate, the camera 10 returns to Step S173 and displays the image in Step S174. Accordingly, for every touch on the clothes change mark 22a, Steps S175, S176, S173, and S174 are repeated in this order and images of the same person with different clothes are sequentially displayed.

If the next clothes change has not been instructed in the determination result in Step S175, the camera 10 subsequently determines whether to go backward or not (S177). Here, the camera 10 determines whether the backward button mark 22b as shown in FIG. 5B has been touched or not. If the camera 10 is to go backward in this determination result, the camera 10 carries out display after displaying an image of a transition effect as opening the previous page (S178), and returns to Step S163. By touching the backward button mark 22b, it is possible to return to the original image of the search.

If the camera 10 needs not go backward in the determination result in Step S177, the camera determines whether continued viewing is set or not (S182). Here, while viewing an image of the clothes change that has been searched for, the user may casually want to view a photograph of a different event where the image was photographed. In this case, the user operates the forward button mark 22h or the backward button mark 22g and thereby the camera 10 displays the next image as in the page turning over operation of Step S165. Then, if either one of these operations has been carried out in the determination result in Step S182, the previous album is returned to the book shelf (S184), and the process goes to Step S166. Note that, when the previous album is returned to the book shelf, the camera 10 displays the album mark 22c for showing that the clothes change mode has been terminated.

If the continued viewing is not set in the determination result in Step S182, the camera 10 subsequently determines whether to terminate the album reproduction or not (S183). Here, the camera 10 determines whether the album button has been operated again or not as in Step S154. If the album reproduction is to be terminated in this determination result, the camera 10 returns to Step S173, and, on the other hand, if the album reproduction is to be terminated, the camera 10 terminates the album reproduction flow and returns to the original flow.

In this manner, in the album reproduction flow of the present embodiment, it is possible to display photographs of the same person wearing different clothes one after another and thereby it is possible to enjoy the viewing of the variegated photographs. Further, when a user finds an interesting photograph among the photographs displayed one after another, the user can view the album including the photograph. The screen display operation of the present embodiment can allow a user to enjoy an operation sense the same as that for a paper album which has been familiar since the past, and, at the same time, can display a small image decorating each photograph by utilizing an advantage of a digital image and also allow the user to view only an interesting image by selection.

Figure 10:
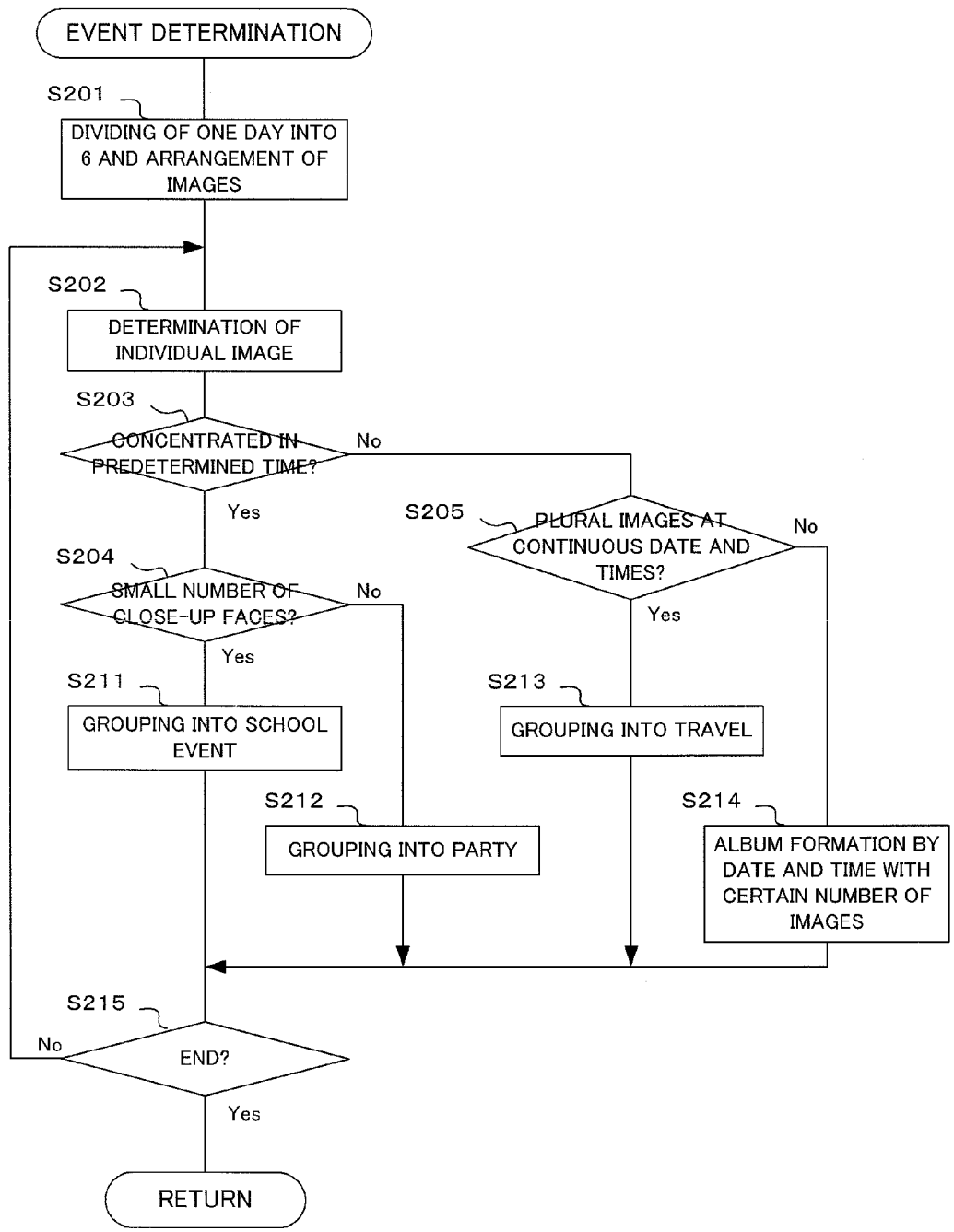
FIG. 10 is a flowchart showing an event determination operation in a camera according to a first embodiment of the present invention.

Next, the event determination subroutine of Step S151 will be described by the use of FIG. 10 and FIG. 11. Event determination groups the images recorded in the recording section 4 for each event, and, specifically, the event determination is a job to generate the album 21a to 21c shown in FIG. 4A. In the present embodiment, the event determination is carried out while the album reproduction shown in FIG. 9 is being carried out in the reproduction mode, but the event determination may be carried out utilizing an idle time except the reproduction mode execution time.

Before the event determination flow itself is described, an event determination method will be described by the use of FIG. 11. FIG. 11 shows the number of images photographed for each time range, and the horizontal axis shows a date and time and the vertical axis shows the number of photographed images. Further, a hatched area shows an image from which a face is detected by the face detection section 3. As apparent from FIG. 11, a large group of images suggest that some event has occurred.

For example, photographing was carried out intensively from morning to afternoon on September 21 and the number of person photographs are smaller than that on September 24. Further, photographing was carried out intensively from afternoon to evening on September 24 and also many person photographs were taken. From this information, it is presumed that a sports festival was photographed on September 21 and a party was photographed on September 24. Meanwhile, when the party is assumed to be photographed on September 24, an image photographed on September 25 is classified into an image group different from that of the party for reproduction. Accordingly, the sports festival images and the party images are grouped into respective independent events and, on the other hand, the photographs of other days are grouped by a date and time so as to have a certain number of images.

The event determination flowchart shown in FIG. 10 will be described. When entering this flow, the camera 10 first divides one day (24 hours) into six divisions and arranges photographed images (S201). This photographed image arrangement is carried out according to the photographing time range using the photographing date and time information recorded together with the photographed image. Note that, while the present embodiment divides 24 hours into six divisions and classifies the photographed images, the time dividing is not limited to this method and the number of divisions may be appropriately changed to four divisions or eight divisions. Subsequently, the camera 10 determines an individual image (S202). Here, the camera 10 determines to which group an individual image belongs, using the information such as the photographing date and time information and the face information according to the above described idea.

Next, the camera 10 carries out the event determination of the photographed image in Step S203 to Step S205. First, the camera 10 determines whether the photographed images are concentrated in a predetermined time range or not (S203). In this step, the camera 10 determines whether the photographing was carried out intensively in a short time or not, for the six divided time ranges. If the photographing has been concentrated in the determination result, the camera 10 subsequently determines whether the number of a close-up faces is small or not, according to the detection in the face detection section 3 (S204).

If the number of the close-up faces is small in the determination result, the photographed images are grouped as a school event such as a sports festival, and, on the other hand, if the number of close-up faces is large, the photographed images are grouped as a party (S212). The school event such as the sports festival is frequently carried out intensively in a short time, and a parent, a brother, or the like photographs children from a long distance and there is a trend that the number of close-up faces is small. A party is frequently carried out in a short time as the school event, but it is possible to discriminate the party from the school event because the number of close-up face photographs is large in the party.

If the photographed images have not been concentrated in the predetermined time range in the determination result in Step S203, the camera 10 determines whether a plurality of images were photographed at continuous date and times (S205). If a plurality of images were photographed at continuous date and times in the determination result, the images are grouped into a travel group (S213), and, on the other hand, if a plurality of images were not photographed at continuous date and times, a certain number of the images are grouped to form an album by a different date and time (S214). Such determination is carried out because, in the case of a travel, photographing is distributed in a day and is not carried out intensively in a short time, but a plurality of images are frequently photographed at continuous date and times. Note that, in the determination whether the photographed image belongs to the travel group or not, it may be added to the determination factor whether the number of landscape images is large or not.

Since the case without a plurality of images at continuous date and times does not correspond to the travel or the above described school event or party, an album is made by a date and time with a certain number of images as an image group of ten or more images, for example. While images are grouped by a month in an example shown in FIG. 4A, the images may be grouped to form an album by plural months depending on the number of images or may be grouped to form an album by a season or a year.

After having grouped the images as albums in Steps S211 to S214, respectively, the camera 10 subsequently determines whether the event determination flow is to be terminated or not (S215). Here, the camera 10 determines whether the event determination has been completed for the individual image recorded in the recording section 4. If the event determination has not been completed for the individual image in this determination result, the process returns to Step S202, and, on the other hand, if the event determination has been completed, the process returns to the original flow.

As described above, the first embodiment of the present invention, when entering the clothes change mode, searches for an image of the same person wearing different clothes and displays the image. Accordingly, it is possible to remember various events while surveying the images, and it is possible to display variegated images and to view an enjoyable and lively album while displaying only a person of interest.

Further, the first embodiment of the present invention searches for an image across the albums even when the images are divided into respective albums by events. Thereby, it is possible to find an image unexpectedly and enjoy the image. Further, the embodiment of the present invention determines the image to be displayed preferentially according to a face image size, the number of face images, or the like. Accordingly, a lower priority is provided to an image with a small face and an impressive image is displayed preferentially.

Note that, while the first embodiment of the present invention utilizes the face detection section for detecting a person image, the detection method of the person image is not limited to this method and another method such as pattern analysis of an eye and nose, a limb, or the like may be utilized. Further, while the present embodiment utilizes a color or a pattern under a face for detecting clothes, another image analysis may be utilized.

Next, a second embodiment of the present invention will be described by the use of FIG. 12A to FIG. 17. While the first embodiment sequentially displays the images which have been searched for, the second embodiment displays a plurality of images at the same time.

The configuration of the second embodiment is approximately the same as that of the first embodiment which has been described by the use of FIG. 1 and detailed explanation will be omitted. Note that the image processing & control section 1 of the present embodiment performs enlargement or shrink of a face detected by the face detection section 3 so as to adjust the face size to that of another image, and also performs image movement so as to locate the face position in the center or the like. Further, the image processing & control section 1 cuts out only a body part from a person image which includes a face detected by the face detection section 3 and performs image processing to separate the body part from a background.

An electronic album function of a camera according to the second embodiment will be described by the use of FIGS. 3A to 3D, FIG. 12, and FIG. 13. The recording section 4 records a number of image data sets and records image classification information of the images, which have been photographed in various situations and classified by a photographing date, together with this image data as the related information. This image classification is the same as that of the first embodiment which has been described by the use of FIG. 7 and FIG. 8.

Figure 12A:
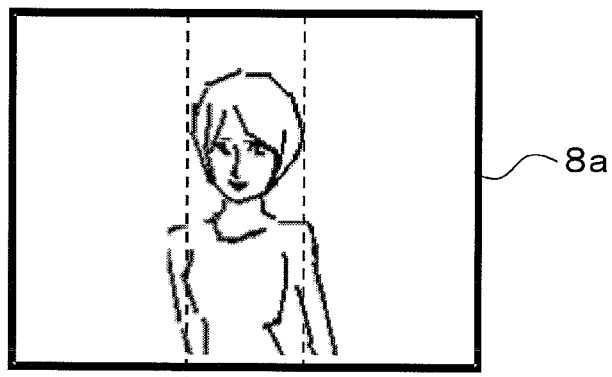
FIGS. 12A to 12D are diagrams showing states of a number of images photographed by a camera according to a second embodiment of the present invention.
Figure 12B:
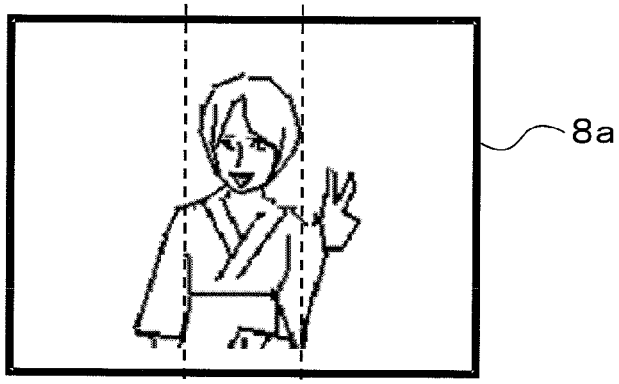
Figure 12C:
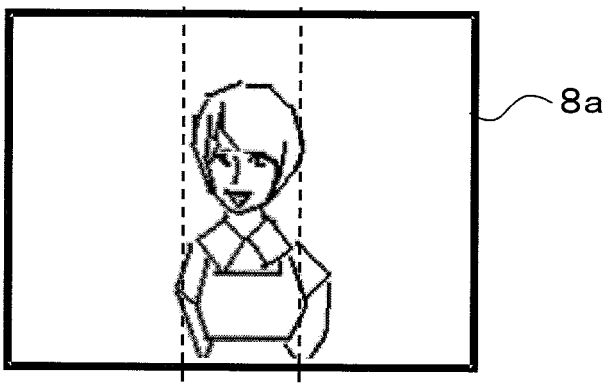
Figure 12D:
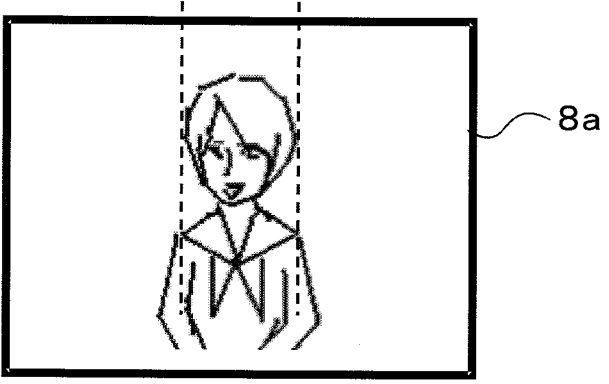

There are sometimes a number of uninterested photographs in an image group which is arranged for each event as shown in FIG. 3A to 3D as described in the first embodiment, and, in this case, the present embodiment allows a user to view the images in a digest version. For example, when the user wants to view a photograph of himself or herself or wants to show the photograph to the others, the user can extract the photograph of himself or herself, and reproduce and display the photograph as shown in FIGS. 12A to 12C. A female user especially is interested in what clothes she wears and sometimes wants to see a photograph of different clothes or wants to show the photograph to the others.

Accordingly, when a person is designated, the present embodiment can easily make the likes of an album of the same person (including the user himself or herself) wearing different clothes in a sense of changing clothes and can enhance enjoyment of taking a photograph. A person of interest is changing clothes and thereby images of the album are variegated, and also various scenes of the different clothes can be enjoyed.

Further, the present embodiment collects images of the same person with different clothes in a clothes change sense and displays these images, and, at this time, adjusts face sizes and positions and also adjusts compositions in the same manner. Thereby, it is possible to emphasize an effect of changing only clothes. Further, the images may be displayed in a slide show format in which an individual image is sequentially switched one by one as shown in FIGS. 12A to 12D. FIGS. 12A to 12D show photographed images of the same person with different clothes and each of the images is adjusted for display so as to have the same face size and position and to locate a face between the vertical broken lines of the drawing.

Figure 13A:
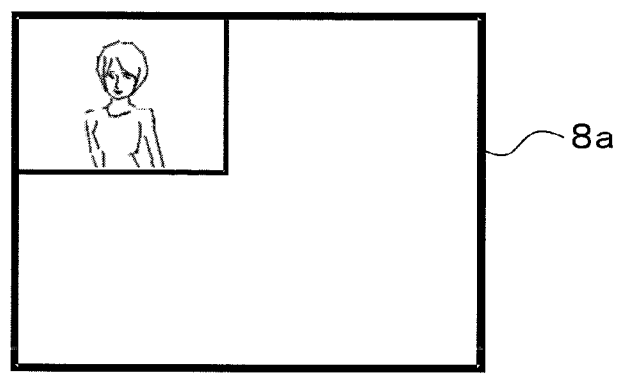
FIGS. 13A to 13D are diagrams showing states of displaying only images of oneself sequentially by dividing one screen in a camera according to a second embodiment of the present invention.
Figure 13B:
Figure 13C:
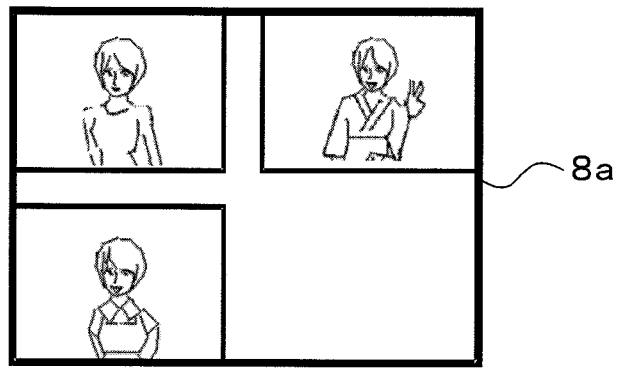
Figure 13D:
Figure 14:
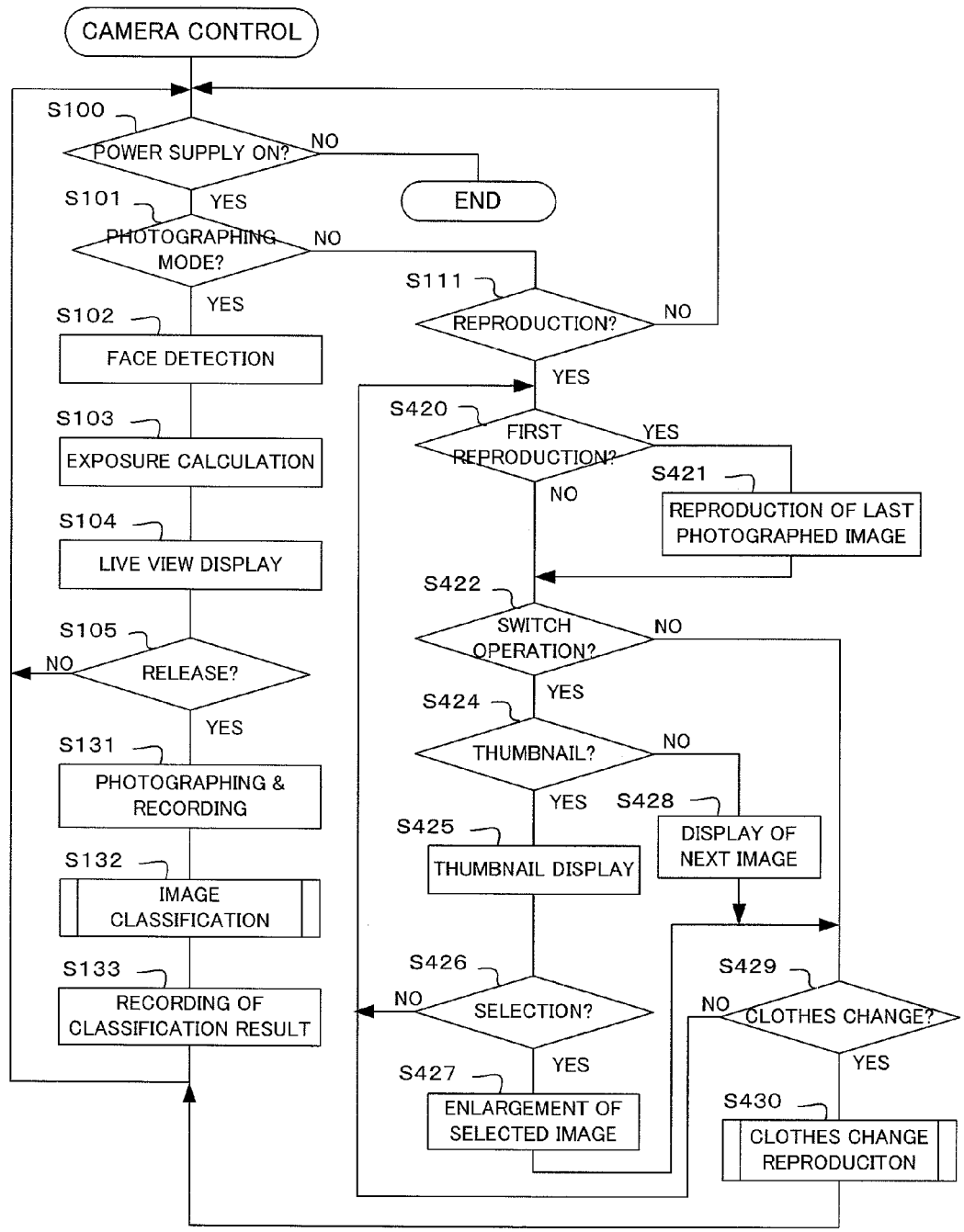
FIG. 14 is a flowchart showing a camera control operation in a camera according to a second embodiment of the present invention.

Further, the images may be displayed by being arranged in divided areas of the same screen as shown in FIGS. 13A to 13D for easy comparison. In this case, one image may be displayed in the upper left area as in FIG. 13A, then another image may be displayed additionally in the upper right area as in FIG. 13B, subsequently still another image may be displayed in the lower left area as FIG. 13C, and lastly all of four images may be displayed as in FIG. 13D. In addition, the four images may not be displayed sequentially but may be suddenly displayed at the same time from the start as shown in FIG. 13D. In this manner, while the images may be displayed at the same time, the sequential display heightens viewer's expectation and allows the user to view the images slowly one by one.

Next, the operation of the camera 10, which enables a user to enjoy the electronic album as described above, will be described by the use of FIG. 14 and FIG. 15. In a camera control flow shown in FIG. 14, Steps from S100 to S105, S111, and S131 to S133 are the same as those of the camera control flow for the first embodiment shown in FIG. 6, and thereby a step performing the same processing is provided with the same step number and detailed explanation will be omitted.

If the camera 10 is not in the photographing mode in the determination result of Step S101, the camera 10 determines whether the mode is the reproduction mode or not (S111). If the mode is not the reproduction mode in this determination result, the process returns to Step S100. On the other hand, if the mode is the reproduction mode, the camera 10 determines whether reproduction display is to be carried out for the first time or not (S420). If the reproduction display is the first one in this determination result, the camera 10 carries out the reproduction of the last photographed image (S421). Here, the last photographed image which has been photographed the most lately is displayed on the display section 8a.

When the last photographed image has been reproduced for display or the reproduction is not the first one in the determination result in Step S420, the camera 10 subsequently determines whether a switch operation has been carried out or not (S422). Here, the operation determination section 6 determines whether the forward button or the backward button operation of the image which has been reproduced to be displayed or the thumbnail button operation for the thumbnail display has been carried out or not. If either one of these operations has been carried out in this determination result, the camera 10 subsequently determines whether the thumbnail button has been operated or not (S424).

If the thumbnail button has been operated in the determination result in Step S424, the camera 10 carries out the thumbnail display (S425). The thumbnail display is a view format displaying a plurality of photographed images recorded in the recording section 4 at the same time on the display section 8a. When having carried out the thumbnail display, the camera 10 determines whether an image has been selected in the thumbnail display (S426). A user selects an image which the user wants to see in an enlarged size, in the thumbnail display by touching the touch panel 8b or the like, and the determination whether the selection has been made or not is carried out according to the touch state on the touch panel 8b in this step.

If an image has not been selected in the determination result in Step S426, the process returns to Step S420. On the other hand, if an image has been selected in the determination result, the camera 10 displays the selected image on the display section 8a in an enlarged size (S427).

If the thumbnail button has not been operated in the determination result in Step S424, the camera 10 displays the next mage (S428). In this step, the camera 10 reads out the next image from the recording section 4 in response to the operation of the forward button or the backward button of the reproduced image and displays the image on the display section 8a.

If the switch operation has not been carried out in the determination result in Step S422, or when the next image has been displayed in Step S428, or when the selected image has been displayed in a enlarged size in Step S427, the camera 10 subsequently determines whether the clothes change mode has been set or not (S429). When the user wants the reproduction display in the clothes change mode which has been described by the use of FIGS. 12A to 12D and FIGS. 13A to 13D, the user operates the clothes change button, and thereby the operation determination section 6 determines whether the clothes button has been operated or not, here.

If the clothes change mode has been set in the determination result in Step S429, the camera 10 carries out the reproduction in the clothes change mode (S430). Here, the camera 10 carries out the reproduction display in the clothes change mode which has been described by the use of above FIGS. 12A to 12D and FIGS. 13A to 13D. A subroutine of the clothes change mode will be described below by the use of FIG. 15. After the clothes change reproduction, the process returns to Step S100. If the clothes change mode has not been set in the determination result in Step S429, the process returns to Step S420.

Figure 15:
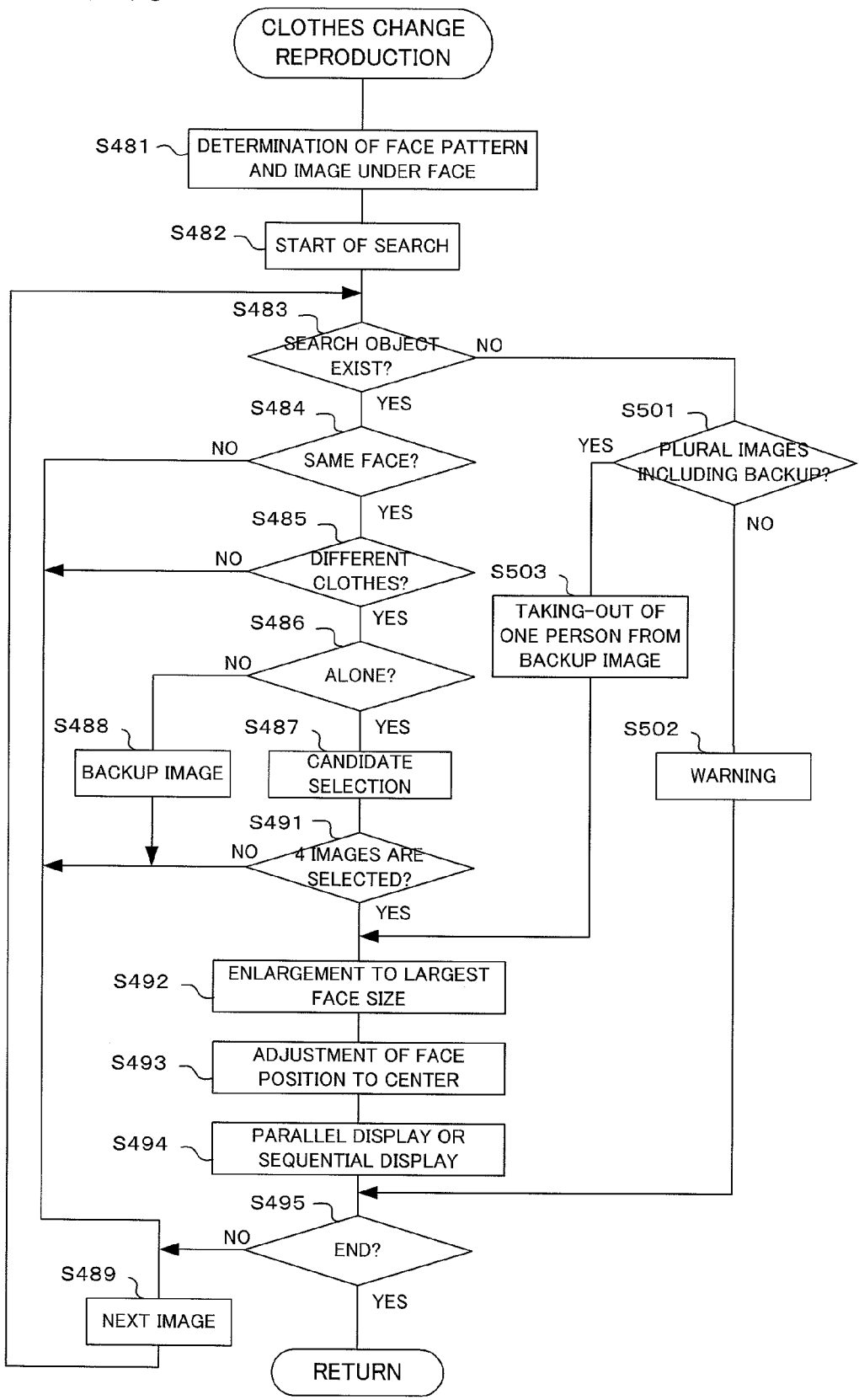
FIG. 15 is a flowchart showing a clothes change reproduction operation in a camera according to a second embodiment of the present invention.

Next, the subroutine of the clothes change reproduction in Step S430 will be described by the use of a flowchart shown in FIG. 15. This clothes change reproduction subroutine divides the screen of the display section 8a into four areas, and carries out display by arranging the images at the same time or arranging the images sequentially, or displays the photographed image of the same person with different clothes one by one without dividing the screen as shown in FIG. 13.

When entering the clothes change reproduction flow, the camera 10 first carries out the determination of a face pattern and an image under the face (S481). Here, the camera 10 carries out the determination of the face pattern and a color and a pattern of the image under the face for the image selected and displayed in Step S421, S428, or S427. In this determination, the determination may be carried out by the use of the related information as shown in FIG. 8A or may be carried out by pattern analysis using the image data. It is possible to carry out the determination quickly by the use of the related information.

After the determination in Step S481, the camera 10 subsequently starts searching (S482). Here, the camera 10 searches for an image which has the same face pattern as that determined in Step S481 and also has a different color or pattern under the face, in Steps S483 to S491. First, the camera 10 determines whether a search object exists or not (S483). Here, the camera 10 determines whether exists or not an image which is recorded in the recording section 4 and has not yet searched in Steps S483 to S491.

If a search object exists in the determination result in Step S483, the camera determines whether the same face exists or not for the image selected in Step S421, S428 or S427 (S484). Here, the camera 10 determines whether exists or not the same face as that of the selected image, that is, a face of the same person. The determination is carried out by the use of the face pattern determined in Step S481.

If the same face exists in the determination result in Step S484, the camera 10 subsequently determines whether the person wears different clothes or not (S485). Here, the camera 10 determines whether a color or pattern under the face is different or not, for the image which has been determined to have the same face in Step S484. The determination is carried out by the use of the determination of the image under the face which has been carried out in Step S481.

If the person wears different clothes in the determination result in Step S485, the camera 10 subsequently determines whether the image includes only one person or not (S486). Here, the camera 10 determines whether only one person is photographed or not in the photographed image of the same person wearing different clothes. The camera 10 specifically determines whether one person image or not, because the clothes change reproduction is sometimes shown to many people and a privacy problem is to be taken into consideration when another person is photographed together. When the person is not photographed alone and the photograph is to be utilized, the camera 10 uses this image by cutting out only the person as will be described below.

If the person is not photographed alone in the determination result in Step 486, the camera 10 stores the image temporarily as a backup image (S488). On the other hand, if the person is photographed alone in the determination result, the camera 10 temporarily stores the image as a candidate image (S487). After having stored the candidate image, the camera 10 subsequently determines whether four images have been selected or not (S491). Here, the camera 10 determines whether all four images are prepared or not, since the present embodiment displays the images by dividing the display screen into four areas as described above.

If four images have not been selected in the determination result in Step S491, or when an image has been temporarily stored as a backup image in Step S488, or if the person does not wear different clothes in the determination result in Step S485, or if the selected image does not have the same face in the determination result in Step S484, the camera 10 subsequently selects the next image (S489) and returns to Step S483. That is, the camera 10 selects the next image and carries out the determinations and processing in Steps S483 to S491 for this selected image.

If a search object does not exist in the determination result in Step S483, the camera 10 determines whether a plurality of images to be displayed for the clothes change exist or not including the backup (S501). In the determination in Step S483, the search object exists no more when all the images recorded in the recording section 4 have been provided with the determinations and processing in Steps S484 to S491. In this state, when two or more photographed images of the same face and different clothes do not exist, the clothes change reproduction is not carried out. Accordingly, if a plurality of photographed images do not exist in the determination result in Step S501, the camera 10 carries out warning that the clothes change is not available (S502).

On the other hand, if a plurality of photographed images exist including the backup in the determination result in Step S501, the camera 10 takes out an image of one person from the backup image (S503). When four images exist for the candidates in Step S487, the clothes change display is carried out by the use of the four images, and, when four images do not exist for the candidates, the camera 10 takes out an image of the same person (trimming) from a backup image of plural persons in this step.

When a one person image has been taken out in Step S503, or if four images are prepared in the determination result in Step S491, the camera 10 subsequently enlarges the images so as to obtain the same face size as the largest one (S492). Here, as described in FIGS. 12A to 12D, the camera 10 adjusts the face sizes to the largest one for obtaining the same face size. Note that, the face sizes may be adjusted to an intermediate one in addition to the largest one, or may be adjusted to a predetermined size (e.g., one fifth of a screen size or the like).

Subsequently, the camera 10 adjusts a face position to the center of the screen (S493). By always displaying the face at the same position, it becomes easy to view the image. Note that obviously the face may be arranged on the slightly left side or right side of the screen not limiting to the center. After having adjusted the face position, the camera 10 displays the four photographed images having been searched for in parallel or sequentially (S494). Here, "display in parallel" means that the photographed images of the same person with different clothes are displayed at the same time or sequentially in the divided four areas of the screen on the display section 8a as described in FIGS. 13A to 13D. Further, "display sequentially" means that the photographed images of the same person with different clothes are sequentially displayed without the screen dividing in the display section 8a as shown in FIGS. 12A to 12D. Note that the parallel display or the sequential display may be appropriately selected by the user in a menu screen or the like or only either one of the two display methods may be selectable.

After the clothes change display in Step S494, or after the warning in Step S502, the camera 10 subsequently determines whether to terminate the process or not (S495). When terminating the clothes change mode, the user operates the clothes change button again, and thereby the camera 10 determines the operation state of the clothes change button, here. If the process is not to be terminated in this determination result, the camera 10 goes to Step S489 and selects the next image, and then returns to Step S483. On the other hand, if the process is to be terminated in the determination result, the camera 10 terminates the clothes change reproduction operation and returns to the original flow.

In this manner, the second embodiment searches for a photographed image of the same person wearing different clothes using a face image pattern and a color and a pattern under the face, and reproduces and displays the photographed image. Accordingly, it is possible to carry out the reproduction display of an image stimulating variegated communication, because even the same person wears different clothes. Further, the present embodiment adjusts face sizes and positions in the same manner in displaying a search result. Thereby, it becomes easy to view images and also to compare the images.

Note that, while the second embodiment divides a screen into four areas for easiness of image arrangement, the number of divisions of the screen may be approximately changed to 2, 3, 6, 8, 9, etc. from 4. Further, the present embodiment selects an image as a backup image only when the image includes a plurality of persons and takes out an image of one person in Step S503. However, Steps S486 and S488 may be omitted and the image of one person may be taken out from all the images.

Figure 16A:
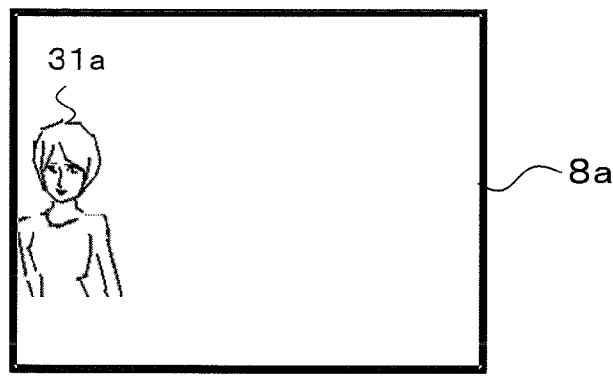
FIG. 16 is a diagram showing a variation of a clothes change display in a camera according to a second embodiment of the present invention.
Figure 16B:
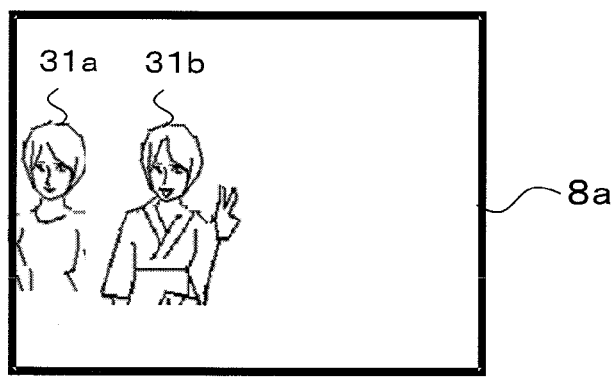

Next, a variation example of a display method of displaying the clothes change will be described by the use of FIG. 16. In addition to the display method as shown in FIGS. 12A to 12D and FIGS. 13A to 13D, the clothes change display may be carried out by a method of arranging only images of a person with changed clothes as shown in FIGS. 16A to 16D, for example. That is, first a person part 31a of the photographed image shown in FIG. 16A is displayed on the display section 8a, and then another person part 31b is displayed in addition to the person part 31a as shown in FIG. 16B.

Figure 16C:
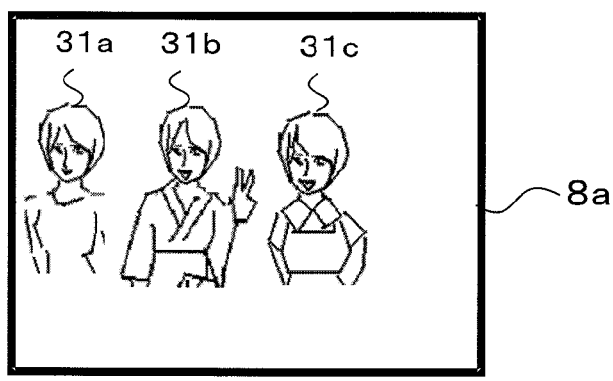
Figure 16D:
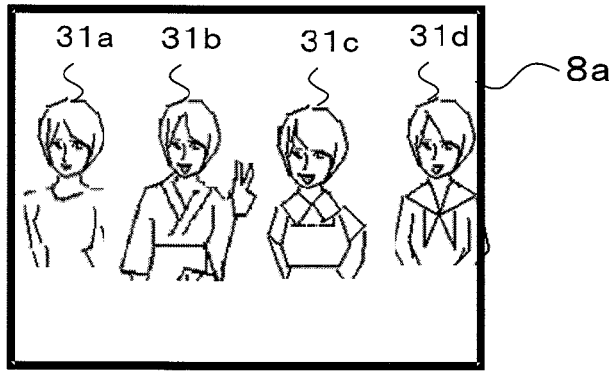

Then, a person part 31C is additionally displayed as shown in FIG. 16C, and subsequently another person part 31d is additionally displayed as shown in FIG. 16D. In FIG. 16D, the four photographed images of the same person with different clothes are displayed closely enough to be displayed within the display section 8a. Such a variation example may be carried out by displaying an image which sequentially arranges the taken-out person parts, in Step S494 after skipping Step S493 in the flow of FIG. 15.

Figure 17A:
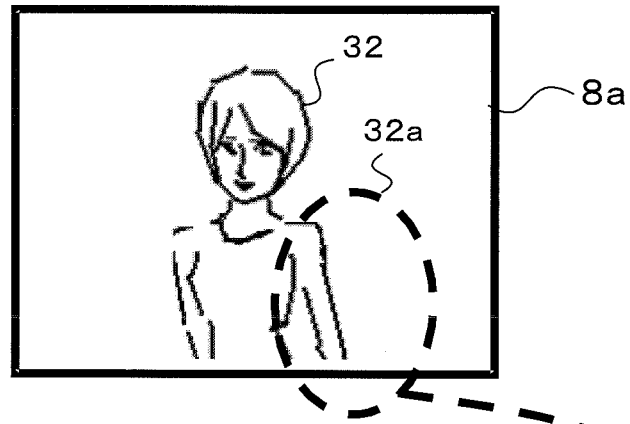
FIG. 17 is a diagram showing another variation of a clothes change display in a camera according to a second embodiment of the present invention.
Figure 17B:
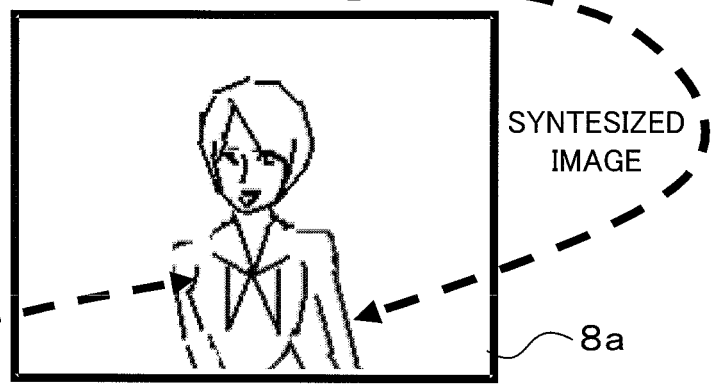
Figure 17C:
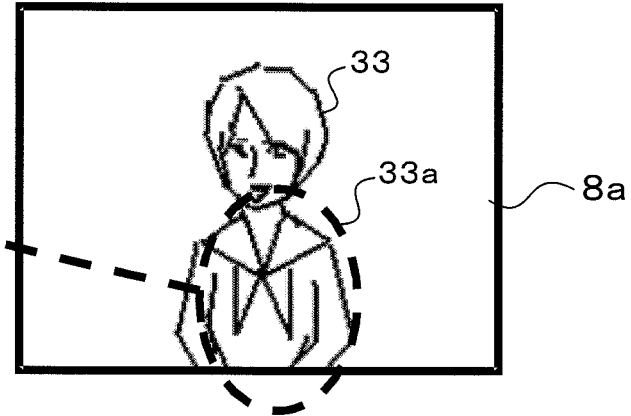

Next, another variation example is shown in FIG. 17 for the display method of displaying the clothes change. This display method is a variation example for the case of sequentially displaying the photographed images of a person with changed clothes as in FIG. 12. In this variation example, the images of FIG. 17A and FIG. 17C are photographed images which was actually photographed and searched for in the clothes change reproduction flow. In the example of FIGS. 12A to 12D, the photographed image of FIG. 12C is displayed next to that of FIG. 12A. The present embodiment inserts an image of FIG. 17B provided with morphing processing between two photographed images.

In the morphing processing, the present variation example combines an arm part 32a of a person 32 shown in FIG. 17A and a body part 33a of a person shown in FIG. 17C, and generates a synthesized image as shown in FIG. 17B. This synthesized image is displayed next to the photographed image of FIG. 17A, and subsequently the photographed image of FIG. 17C is displayed. The present variation example inserts the synthesized image between the photographed images and thereby has an advantage of providing a smooth change between the photographed images. In the present variation example, the images may be displayed while being provided with this morphing processing sequentially when the images are displayed in Step S494 of the flow in FIG. 15.

As described above, the second embodiment of the present invention searches for an image of the same person wearing different clothes and displays this image. Accordingly, it is possible to carry out the reproduction display of a variegated image as stimulating communication.

Further, the second embodiment of the present invention, after having searched for a predetermined number of images (after having reached four images in Step S491 in the example of FIG. 8), displays the images in a lump. Accordingly, it is possible to enjoy a group of images of the same person with different clothes at the same time or sequentially. Further, the embodiment of the present invention displays images by adjusting face positions and sizes in the same manner. Thereby, it is easy to view the images and to compare the images.

Further, the first and second embodiments of the present invention can extract only a person part and display this person part. By displaying only the person part, it is not necessary to mind the privacy of a person photographed together and it becomes easy to compare clothes.

Note that the second embodiment displays an image without separating a background from a person part when the image is determined to be a one person image in Step S486. However, not limited to this method, the background may be separated from the person part and only the person part may be displayed for all the images.

Further, the second embodiment adjusts a face size in the same manner and also adjusts a face position in the same manner. However, not limited to this method, only either one of the face size and the face position may be arranged in the same manner.

Further, while the first and second embodiments of the present invention utilize the face detection section for detecting a person image, not limited to this method, another detection method such as pattern analysis of an eye and a nose, a limb, or the like may be utilized. In addition, while a color or a pattern under the face is utilized for detecting clothes in the embodiments, another image analysis other than this method may be utilized.

Further, while the first and second embodiments of the present invention display images of the same person with different clothes sequentially or at the same time, it is optional to synthesize an image by changing only a clothes part of the same person without changing a face part and to display this synthesized image. In this case, the face part of a person is not changed and only the clothes part is changed, and thereby it is possible to enjoy the change of clothes as that of a dress-up doll.

The first and second embodiments and the variation example of the present invention take out a person image from a photographed image having a background. The method of this taking-out may be performed by carrying out a stereo-photographing using a camera having two photographing systems and cutting out a part without parallax as the background. In addition, a part reflecting a lot of light is taken out when irradiated by strong strobe light, and the part may be used as the person image. Further, a person image is photographed and may be utilized as the person image. Obviously, a face part is detected and a part having an outline connected to that of the face may be assumed to be a person image. Anyway, any method capable of taking out a person part from an image can be utilized by each of the embodiments.

Further, while the first and second embodiments of the present invention are described by the use of a digital camera as a photographing device, the camera may includes a single-lens reflex digital camera, a compact digital camera, and a moving picture camera such as a video camera and a movie camera, and further includes a camera included in a mobile phone, a portable information terminal (PDA: Portable Digital Assistant), a game machine, or the like.

Moreover, while the function of an image display apparatus is included in the photographing apparatus in the first and second embodiments of the present invention, not limited to this case, the image display apparatus may be a device without the photographing function such as a television and a personal computer. In this case, image data photographed by a photographing apparatus may be once stored in recording sections of these devices. While the present embodiments carry out the image classification in photographing images, each of these devices may obtain related information such as the image classification, when storing the image without preliminarily attached related information such as the image classification into the recording section. Further, the image may be displayed by the cooperation of a monitor device such as a television and a photographing apparatus such as a camera.

The present invention is not limited to each of the above embodiment without change and can be realized by modifying the constituents without departing from the spirit thereof for implementation. Further, various inventions can be formed by the appropriate combinations of the plurality of constituents disclosed in the above embodiments. For example, some constituents may be omitted from all the constituents shown in the embodiments. Moreover, the constituents across the different embodiments may be combined appropriately.

What is claimed is:

1. An image display apparatus, comprising:
a face detection section detecting a face image within a photographed image using image data of the photographed image;
a classification section classifying the photographed image by a pattern of the face image, and at least one of a color under the face image and a pattern under the face image;
an image recording section recording the image data of the photographed image, wherein the image recording section records related information associated with the image data according to the classification by the classification section when recording the image data; and
a display control section searching the plurality of photographed images according to the related information recorded in the image recording section and displaying the image which has been searched for,
wherein the face detection section is capable of detecting a size and a position of the face image; and
the display control section changes the size and/or the position of the face image, displays the face images by adjusting the respective positions thereof in the same manner, and determines whether or not only one person is photographed in the image, and responsive to a determination that the number of images each including the only one person does not reach a predetermined value, the display control section trims an image of the one person to display the trimmed image.

2. The image display apparatus according to claim 1, wherein:
the face detection section is capable of detecting a size and a position of the face image, and the number of the face images; and
the display control section determines an image to be preferentially displayed according to the size of the face image and the number of the face images.

3. The image display apparatus according to claim 1, further comprising
a search section searching for an image so as to perform searching across a plurality of image groups which have been formed in a first predetermined condition, the image satisfying a second predetermined condition different from the first predetermined condition and also not satisfying a third predetermined condition.

4. The image display apparatus according to claim 3, wherein
the first predetermined condition is an event determination condition by a photographing date and time, the second predetermined condition is a condition for a person photographed in the image, and the third predetermined condition is a condition for clothes of the person.

5. The image display apparatus according to claim 1, wherein
the display control section displays a synthesized image synthesized from two of the photographed images when displaying the photographed images.

6. The image display apparatus according to claim 5, wherein
the synthesized image is synthesized by replacing a part of the photographed image to be displayed first with a corresponding part of the photographed image to be displayed subsequently.

7. The image display apparatus of claim 1 wherein
the display control section changes the size of the face image, and displays the face images by adjusting the respective positions thereof in the same manner such that the faces from each of a plurality of different images are displayed with a consistent size.

8. The image display apparatus of claim 1 wherein
the display control section changes the position of the face image, and displays the face images by adjusting the respective positions thereof in the same manner such that the faces from each of a plurality of different images are displayed at a consistent position.

9. An image display apparatus, comprising:
a storage section storing image data of a photographed image;
a person image extraction section extracting an image of a person from the photographed image;
a clothes determination section determining a clothes part in the image data of the image of a person extracted by the person image extraction section, wherein the storage section records related information associated with the image data according to the determination by the clothes determination section when recording the image data;
a search section searching for an image in which the same person extracted by the person image extraction section has been determined to wear different clothes by the clothes determination section, according to the related information stored in the storage section; and
a display section displaying the image searched for by the search section, wherein the display section determines whether or not only one person is photographed in the image, and responsive to a determination that the number of images each including the only one person does not reach a predetermined value, the display section trims an image of the one person to display the trimmed image.

10. The image display apparatus according to claim 9, wherein the person image extraction section includes a face detection section and extracts a person by face detection of the face detection section.

11. The image display apparatus according to claim 10, wherein
the clothes determination section detects a color and/or a pattern of a part under a face of the person and carries out determination according to the detection result.

12. The image display apparatus according to claim 10, wherein
the search section determines a priority of display in consideration for at least one of the number of the faces, a face size, and a face position which have been detected by the face detection section.

13. The image display apparatus according to claim 9, wherein
the display section classifies the image stored in the storage section for each event by a photographing date and time, and displays an album grouping the images for each classification.

14. The image display apparatus according to claim 13, wherein
the search section searches also images belonging to the different album when searching for the image of the same person wearing different clothes.

15. The image display apparatus according to claim 9, wherein
the display section displays the photographed images of the same person wearing different clothes sequentially one by one, the photographed images having been searched for by the search section.

16. The image display apparatus according to claim 15, wherein
the display section displays a synthesized image synthesized from two of the photographed images between the two photographed images when displaying the photographed images.

17. The image display apparatus according to claim 9, wherein
the display section displays the plural photographed images of the same person wearing different clothes in parallel, the plural photographed images having been searched for by the search section.

18. The image display apparatus according to claim 9, wherein
the person image extraction section is capable of detecting a size and a position of the face image; and
the display section changes the size and/or the position of the face image, and displays the face images by adjusting the respective positions thereof in the same manner.

19. An image display method, comprising the steps of:
determining that a person has been designated in a stored photographed image, wherein when image data of the stored photographed person is recorded, related information associated with the image data is recorded according to the determination by clothes determination section;
determining a clothes part in an image of the designated person according to the related information;
searching for an image of different clothes of the same person as the designated person according to the related information; and
displaying the image that has been searched for, wherein at the time of display, it is determined whether or not only one person is photographed in the image, and responsive to a determination that the number of images each including the only one person does not reach a predetermined value, an image of the one person is trimmed and the trimmed image is displayed.

20. A non-transitory computer-readable medium storing a computer program for:
determining that a person has been designated in a stored photographed image, wherein when image data of the stored photographed person is recorded, related information associated with the image data is recorded according to the determination by clothes determination section;
determining a clothes part in an image of the designated person according to the related information;
searching for an image of different clothes of the same person as the designated person according to the related information; and
displaying the image that has been searched for, wherein at the time of display, it is determined whether or not only one person is photographed in the image, and responsive to a determination that the number of images each including the only one person does not reach a predetermined value, an image of the one person is trimmed and the trimmed image is displayed.

* * * * *